(12) United States Patent
Hung et al.

(10) Patent No.: US 12,401,623 B2
(45) Date of Patent: Aug. 26, 2025

(54) MERGING CHAINED ACTIONS IN TRAFFIC POLICIES HAVING BRANCH RULES

(71) Applicant: Arista Networks, Inc., Santa Clara, CA (US)

(72) Inventors: Denny Hung, Cupertino, CA (US); Ethan R. Vadai, San Jose, CA (US); Muhammad Yousuf, Cupertino, CA (US); Ramakrishna Paduvalli, Saratoga, CA (US); Michael K. Chen, Palo Alto, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 618 days.

(21) Appl. No.: 17/844,255

(22) Filed: Jun. 20, 2022

(65) Prior Publication Data

US 2023/0082978 A1    Mar. 16, 2023

Related U.S. Application Data

(63) Continuation-in-part of application No. 17/476,352, filed on Sep. 15, 2021.

(60) Provisional application No. 63/304,153, filed on Jan. 28, 2022.

(51) Int. Cl.
*H04L 47/20* (2022.01)
*H04L 9/40* (2022.01)
*H04L 47/2416* (2022.01)
*H04L 47/2441* (2022.01)

(52) U.S. Cl.
CPC .......... *H04L 63/0263* (2013.01); *H04L 47/20* (2013.01); *H04L 47/2416* (2013.01); *H04L 47/2441* (2013.01); *H04L 63/0236* (2013.01); *H04L 63/20* (2013.01)

(58) Field of Classification Search
CPC .... H04L 63/063; H04L 63/0236; H04L 63/20
See application file for complete search history.

(56) References Cited

U.S. PATENT DOCUMENTS

| | | | |
|---|---|---|---|
| 8,316,151 B1 * | 11/2012 | Ammundi | H04L 69/22 709/239 |
| 8,339,959 B1 * | 12/2012 | Moisand | H04L 45/60 370/235 |
| 8,407,779 B1 | 3/2013 | Shah et al. | |
| 8,719,917 B1 | 5/2014 | Ammundi | |
| 9,391,958 B2 | 7/2016 | Swaminathan et al. | |
| 9,571,502 B2 * | 2/2017 | Basso | H04L 63/101 |

(Continued)

OTHER PUBLICATIONS

Schlesinger et al., "Concurrent NetCore: From Polices to Pipelines", Proceedings of the 2009 ACM Sigplan Conference on Programming Language Design and Implementation, Jun. 15-20, 2009, vol. 49, No. 9, Aug. 19, 2014, pp. 11-24.

(Continued)

*Primary Examiner* — Dhairya A Patel
(74) *Attorney, Agent, or Firm* — Fountainhead Law Group, PC

(57) ABSTRACT

A traffic policy includes policy rules that specify branch actions in their action fields. A branch action specifies another policy rule in the traffic policy. Packet filters generated from the traffic policy represent the traffic policy rules and execution order semantics of the branch rules. The packet filters include resolved actions that are generated by resolving the original actions in the policy rules.

20 Claims, 17 Drawing Sheets

(56) References Cited

U.S. PATENT DOCUMENTS

| | | | |
|---|---|---|---|
| 10,652,281 | B1 | 5/2020 | Moolenaar et al. |
| 10,778,612 | B2* | 9/2020 | Immidi ................. H04L 49/354 |
| 11,968,285 | B2* | 4/2024 | Levy .................... H04L 45/742 |
| 2006/0200622 | A1 | 9/2006 | Ahuja et al. |
| 2008/0215518 | A1 | 9/2008 | Matsuda |
| 2009/0052443 | A1* | 2/2009 | Kolenchery ........ H04L 63/0263 370/389 |
| 2009/0199266 | A1* | 8/2009 | Kling ................. H04L 63/0263 726/13 |
| 2014/0282854 | A1 | 9/2014 | Clark et al. |
| 2017/0346765 | A1* | 11/2017 | Immidi ................. H04L 45/302 |
| 2018/0083876 | A1* | 3/2018 | Sharma .............. H04L 45/7452 |
| 2018/0167307 | A1* | 6/2018 | Barry ..................... H04L 45/02 |
| 2019/0230126 | A1* | 7/2019 | Kumar ................... H04L 45/74 |
| 2021/0067448 | A1* | 3/2021 | Remen ............. H04L 45/74591 |
| 2021/0226920 | A1* | 7/2021 | Ahn ...................... G06F 21/562 |
| 2021/0243158 | A1 | 8/2021 | Fandli et al. |
| 2021/0326175 | A1* | 10/2021 | Herbert .................. G06F 9/541 |

OTHER PUBLICATIONS

Smolka et al., "A fast compiler for NetKAT", ACM Sigplan Notices, Association for Computing Machinery, vol. 50, No. 9, Aug. 29, 2015, pp. 328-341.

International Searching Authority, "International Search Report & Written Opinion", PCT/2023/061077, mailed Apr. 24, 2023, 13 pgs.

* cited by examiner

```
traffic policy, 600 traffic-policy example-policy
    match A ipv4
        source prefix 1.1.1.1/32
        actions
            count acc-A
            goto C
    match B ipv4
        protocol tcp source port 1
        actions
            count acc-B
            goto D
    match C ipv4
        protocol tcp destination port 2
        actions
            count acc-C
    match D ipv4
        destination prefix 2.2.2.2/32
        actions
            count acc-D
```

```
def GotoActionResolver( ruleList ):

// Assume that the last rule is always a match-all while ruleList has a rule with GOTO action:

Let R_c be the lowest priority rule with GOTO action
        Let i be the priority of the rule that R_c continues to nextPriority = priority of rule following R_c
        remove R_c -> A_c from the ruleList while True:
            nextGotoPriority = priority of rule following
                               R_i, or i+1 if R_i is the last rule
            remove R_i -> A_i from the ruleList DECOMPOSE(R_i, R_c) = <IR(i, c), R_i\IR(i, c)> if IR(i, c) is not empty:
                insert IR(i, c) -> A(i, c) at priority nextPriority
                nextPriority = priority of rule following R_nextPriority for all rules in Ri\IR(i, c):
                insert rule -> A_i at a priority between
                               i and nextGotoPriority if IR(i, c) == R_c: # containment criterion
                break i = nextGotoPriority
```

FIG. 8

```
                              ┌─ original traffic policy, 900
┌─────────────────────────────────────────────┐
│ R0 → [A0] {0}                               │
│ R1 → [A1, GOTO R2] {1,2,3,5}                │
│ R2 → [A2] {2,5,7}                           │
│ R3 → [A3] {3,5, 6,8}                        │
│ <match-all> → [ ] {0,1,2,3,4,5,6,7,8}       │
└─────────────────────────────────────────────┘
```

FIG. 9A

```
                              ┌─ flattened rules list, 902
┌─────────────────────────────────────────────┐
│ R0 → A0 {0}                                 │
│                                             │
│ // Intersection Rule                        │
│ IR(1, 2) → [A(1, 2)] {2, 5}                 │
│ IR(1, 3) → [A(1, 3)] {3, 5}                 │
│ IR(1, match-all) → [A1] ] {1,2,3,5}         │
│                                             │
│ // Difference Rules                         │
│ R2 \ IR(1, 2) → [A2] {7} - R2               │
│ R3 \ IR(1, 3) → [A3] {8} - R3               │
│ <match-all> → [ ] {0,..,8}                  │
└─────────────────────────────────────────────┘
```

FIG. 9B

```
R0 → [A0] {0}
R1 → [A1, GOTO R3] {1,2,3,5,9}
R2 → [A2] {2,5,7}
R3 → [A3] {3,5, 6,8}
R4 → [A4] {9, 10}
<match-all> → [ ] {0,1,2,3,4,5,6,7,8,9,10}
``` original traffic policy, 1000

// Start of rules skipped by the continue
R2 → [A2] {2,5,7}

// Start of difference rules
R3 \ IR(1, 3) → [A3] {6, 8}
R4 \ IR(1, 4) → [A4] {10}

<match-all> → [ ] {0,..,10}
``` flattened rules list, 1002

FIG. 10B reference to first rule
in traffic policy 1204

```
traffic-policy policy1
    match rule-A ipv4
        source prefix 1.1.1.1/32
        actions
            count acc-A
            goto rule-C
    match rule-B ipv4
        protocol tcp source port 1
        actions
            count acc-B
            goto rule-X
    match rule-C ipv4
        protocol tcp destination port 2
        actions
            count acc-C
    match rule-X ipv4
        source prefix 5.5.5.5/32
        actions
            count acc-A
    match rule-Y ipv4
        destination port 100
        actions
            drop
``` appended rules

FIG. 12B

MERGING CHAINED ACTIONS IN TRAFFIC POLICIES HAVING BRANCH RULES

CROSS REFERENCE TO RELATED APPLICATIONS

Pursuant to 35 U.S.C. § 119(e), this application is entitled to and claims the benefit of the filing date of U.S. Provisional App. No. 63/304,153 filed Jan. 28, 2022, the content of which is incorporated herein by reference in its entirety for all purposes.

This application is a continuation-in-part application and, pursuant to 35 U.S.C. § 120, is entitled to and claims the benefit of earlier filed application U.S. application Ser. No. 17/476,352 filed Sep. 15. 2021, the content of which is incorporated herein by reference in its entirety for all purposes.

BACKGROUND

A network traffic policy is used to identify packets (ingress or egress) for processing. The traffic policy is an ordered list of policy rules, each of which is associated with a set of actions. Each rule is expressed as a combination of match criteria classifying packets (ingress or egress). The rules are processed and eventually compiled into a list of packet filters that can be used in a packet processor. Generally, the list of packet filters are ordered in the same order as the list of source rules, where the first rule in the list is deemed to have highest priority and the last rule has lowest priority. The packet processor matches the list of packet filters against a packet in prioritized, first-hit fashion. In other words, actions associated with the highest priority packet filter that matches the packet are applied to the packet.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 8 shows an algorithm for compiling a traffic policy in accordance with the present disclosure.

FIGS. 9A and 9B show an illustrative example of processing a traffic policy in accordance with FIG. 8.

FIGS. 10A and 10B show another illustrative example of processing a traffic policy in accordance with FIG. 8.

FIGS. 12A and 12B illustrate an alternative form of the GOTO action.

DETAILED DESCRIPTION

Figure 1:
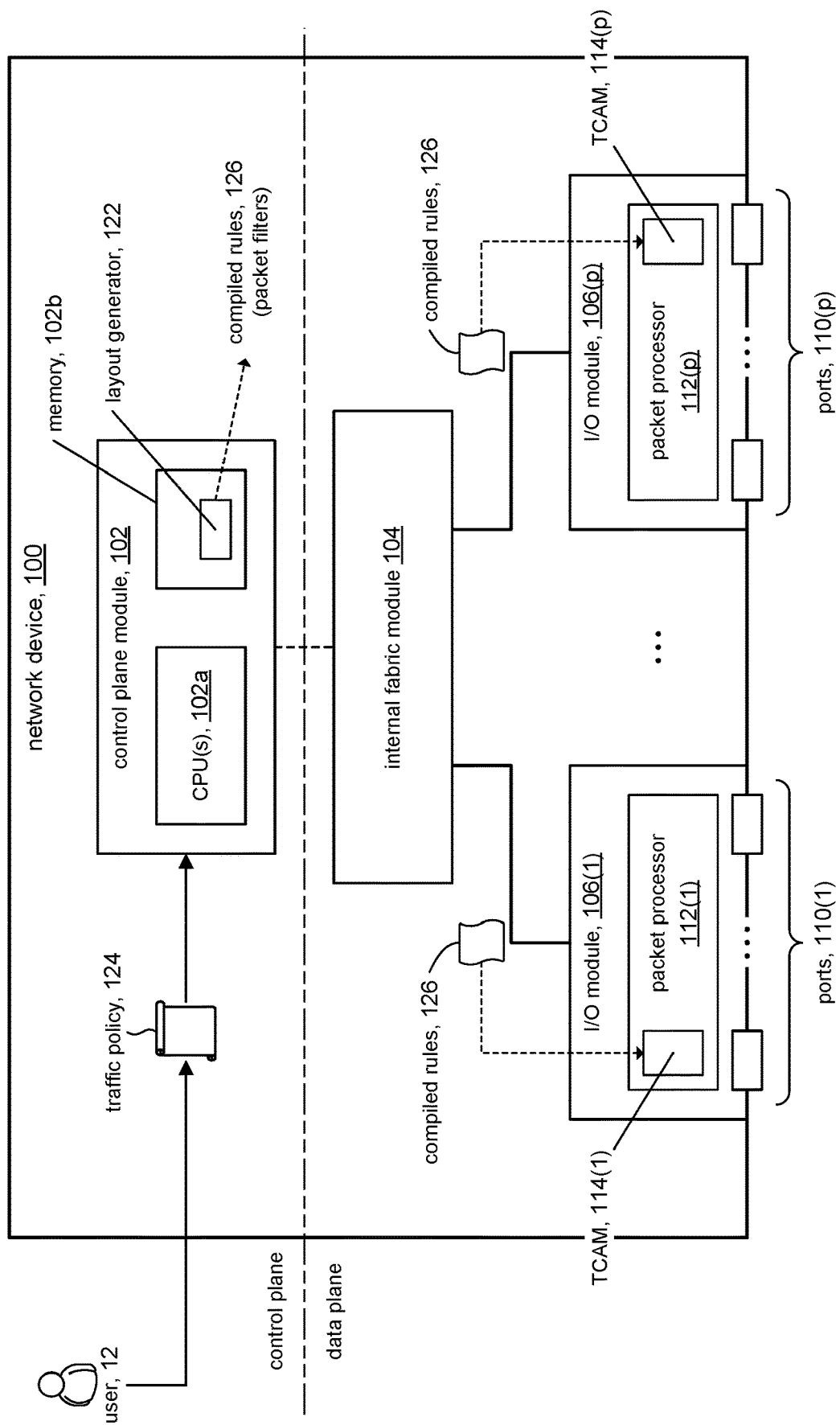
FIG. 1 is a block diagram of a network device in accordance with the present disclosure.

The present disclosure describes GOTO action functionality for policy classification rules in a traffic policy. A GOTO action is an action like any other action that can be associated with a policy rule. The GOTO action specifies another rule in the traffic policy, thus providing a form of rule branching in the policy. The GOTO action can appear in more than one rule.

The GOTO action has the following meaning (effect, execution semantics) in the traffic policy: When a rule having a GOTO action is matched (hits), the actions associated with that rule are applied to the packet and the GOTO action says to continue classification of the packet with the rule specified in the GOTO action.

An aspect of the present disclosure includes extending a human-readable specification language for specifying policy classification rules in a traffic policy to include the GOTO action. A language used to specify the policy rules in a traffic policy, for example, can be extended to include the following syntax:

GOTO<rule_ID>, where rule_ID specifies a non-adjacent rule in the policy that is lower priority than the rule that contains the GOTO action. Stated differently, rule_ID appears lower in the ordered list of rules than does the rule that contains the GOTO action. It will be appreciated that rule_ID can specify a lower priority adjacent rule as well.

Another aspect of the present disclosure includes translating the set of policy rules (source rules) in a traffic policy to produce a corresponding set of compiled rules (packet filters) that preserve the GOTO semantics and priority order of the source rules. While GOTO actions used in the source rules express branching in human-readable form, the compiled rules express the same branching semantics in a linear fashion in order to accommodate the linear processing nature of a packet processor.

The present disclosure improves the functioning of a conventional packet classifier by providing additional classification capability in the packet classifier via the GOTO action. The GOTO action specifies limited branching among the rules in a traffic policy, which allows a user to specify a policy where a packet may be processed by more than one rule. The present disclosure provides for translation of those rules to a linear representation so they can be processed by a conventional packet processor. The present disclosure provides this additional capability without having to replace existing packet processing circuitry, thus avoiding costly hardware upgrades while at the same time gaining benefits made possible by the present disclosure.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows an example of a network device 100 in accordance with some embodiments of the present disclosure. In some embodiments, for example, network device 100 can be a switch or a router. Functionally, network device 100 can be described in terms of control plane functions and data plane functions, although the control plane and data plane may not exist physically. Control plane functionality is known. Briefly, the control plane determines how packets should be forwarded. The control plane provides the functions and processes that determine which path to use to send a packet or a frame. Functions include populating a routing table, drawing network topology, generating a forwarding table and the like.

In some embodiments, network device 100 can include control plane module 102, internal fabric module 104, and I/O modules 106(1)-106($p$). Control plane module 102 can include one or more CPUs 102$a$ for managing and controlling operations of network device 100 in accordance with the present disclosure. Each CPU 102$a$ can be a general purpose processor (e.g., Intel® x86, AMD® x86, ARM® processor, etc.) that operates under the control of software stored in memory 102$b$, such as dynamic random access memory (DRAM), within which to execute software to provide various functionality comprising the control plane module.

Control plane module 102 can include layout generator 122 configured to compile traffic policy 124 in accordance with the present disclosure. In some embodiments, layout generator 122 can be a software module that executes in the control plane. Additional details of layout generator 122 are discussed below. Briefly, layout generator 122 can convert traffic policy 124 to produce compiled rules (packet filters) 126, which can then be downloaded to and processed in the data plane.

Internal fabric module 104 and I/O modules 106(1)-106($p$) collectively represent the data plane of network device 100 (also referred to as the data layer, forwarding plane, etc.). The data plane represents a high speed data path for packet flow through the network device. Packets that pass through the network device are processed in the data plane, as opposed to control packets that are directed to the network device.

Internal fabric module 104 represents interconnection between the various other modules of network device 100. Each I/O module 106(1)-106($p$) can include one or more input/output ports 110(1)-110($p$) that are used by network device 100 to send and receive network packets. Each I/O module 106(1) — 106($p$) can also include respective packet processor 112(1)-112($p$). Each packet processor 112(1)-112($p$) can comprise a forwarding hardware (e.g., application specific integrated circuit (ASIC), field programmable array (FPGA), digital processing unit, content-addressable memory, and the like) configured to make wire speed decisions on how to handle incoming (ingress) and outgoing (egress) packets. In some embodiments, the forwarding hardware in each packet processor can be configured as a series of stages called a pipeline, allowing for concurrent processing of several packets at a time along different stages down the pipeline.

In some embodiments, each packet processor 112(1)-112($p$) can include respective ternary content-addressable memories (TCAMs) 114(1)-114($p$) to store compiled rules 126. TCAMs are known. Briefly, a TCAM contains a list of <key, value> pairs. The list is "prioritized" in that a <key, value> pair that occurs earlier in the list is deemed to have higher priority than a <key, value> pair that occurs later in the list. The key field in a <key, value> pair can specify "don't care" values (e.g., '*') to enable multiple matches. For example:

key="001*0001"will match on input keys "00100001" and "00110001".

When a key is input to the TCAM, the TCAM performs a lookup in its memory to see if the input key is stored in any of the stored <key, value> pairs. If the input key matches multiple <key, value> pairs, the TCAM can output the highest priority <key, value> pair among the multiple matches. TCAMs can be configured to perform the lookup operation in a single pass through its memory in order to achieve high throughput for lookup operations in a network device. TCAMs can also be collectively referred to as a forwarding information base (FIB).

The <key, value> pairs stored in TCAMs 114(1)-114($p$) can serve to classify and process packets (ingress packets and egress packets) that flow through the network device. In the context of network devices, compiled rules 126 in a TCAM comprise a list of <key, value> pairs. Each <key, value> pair can be referred to as a "packet filter." It is noted that the terms compiled rules and packet filters can be and are used interchangeably.

Figure 2:
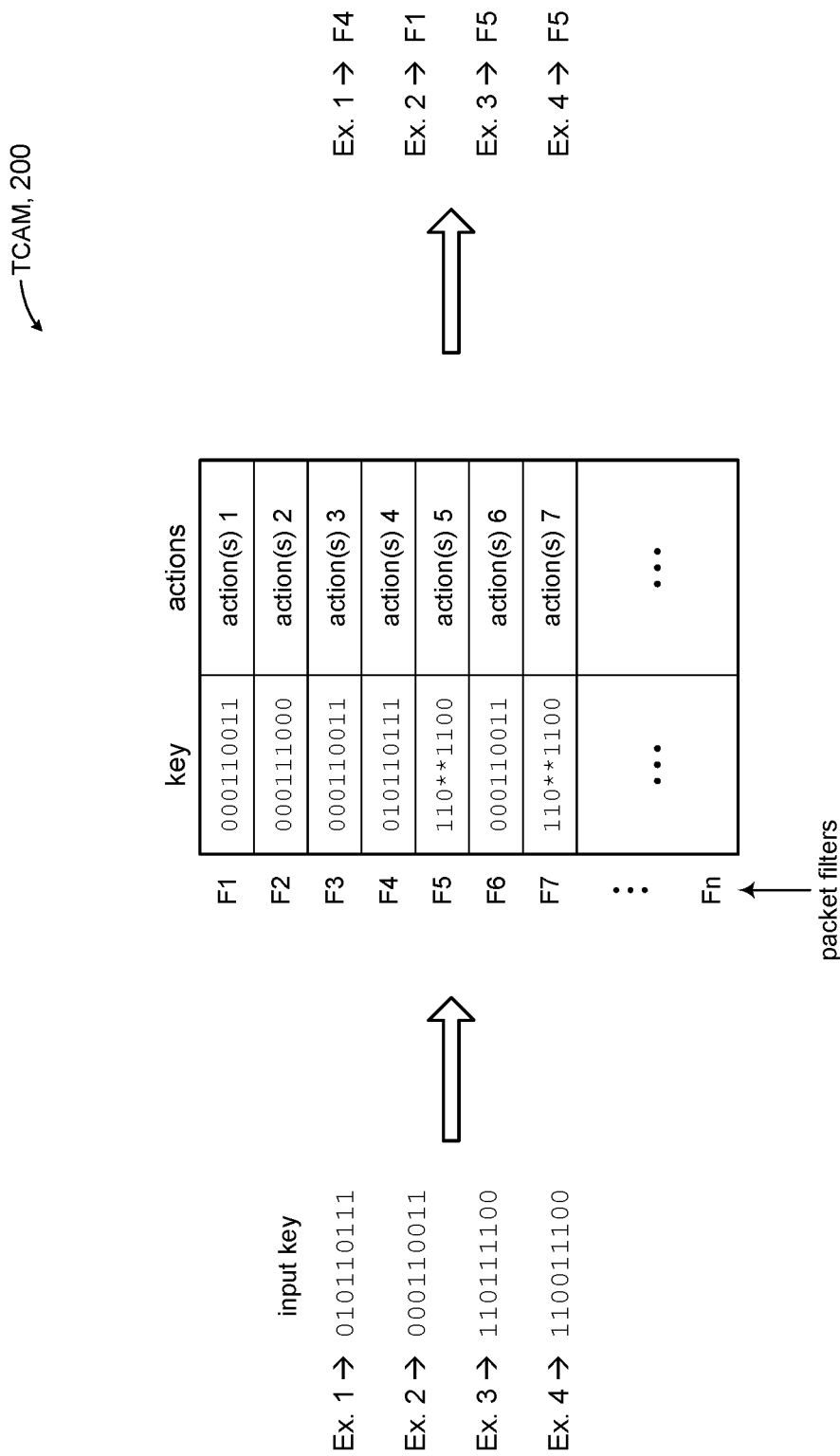
FIG. 2 shows a TCAM in accordance with the present disclosure.

Referring to FIG. 2, the prioritized lookup described above is illustrated with TCAM 200. The TCAM stores a list of packet filters F1 to Fn. As noted above, the rules are "prioritized" in that packet filter Fi is deemed to be higher in priority than packet filter Fj (i<j) appearing further down in the list. For example, F1 is higher priority than F2, which is higher priority than F3, and so on. Each packet filter comprises a key field and a value (actions) field. The TCAM performs a lookup by receiving an input key and searching on the key field.

Example 1 is a lookup with a key ('01011011') that occurs in one filter in TCAM 200, namely F4. Accordingly, the lookup will output packet filter F4.

Example 2 is a lookup with a key ('000110011') that occurs in multiple filters in TCAM 200, namely F1, F3, and F6. Accordingly, TCAM 200 will output F1 because F1 is the highest priority matching packet filter. If filter F1 is subsequently removed from the TCAM (e.g., filter F1 ages out), then a subsequent lookup using input key '000110011' would produce filter F3 because F3 would now be the highest priority matching filter.

Example 3 is a lookup with a key ('110111100') that is matched by filters F5 and F7 by virtue of the presence of don't care symbols in the key fields of F5 and F7. The TCAM would output packet filter F5.

Example 4 is a lookup with a key ('110011100') that is also matched by filters F5 and F7 by virtue of the presence of don't care symbols in the key fields of F5 and F7. The TCAM again would output filter F5.

Referring back to FIG. 1 for a moment, packet filters can be specified by user 12 (e.g., a network administrator) in a textual human-readable format referred to as a traffic policy. A traffic policy classifies or otherwise identifies packets to perform actions associated with the identified packets. Traffic policy 124 can be compiled or otherwise processed in accordance with the present disclosure to create corresponding compiled rules (packet filters) 126. The compiled rules can then be downloaded to packet processors 112(1)-112(p).

Figure 3:
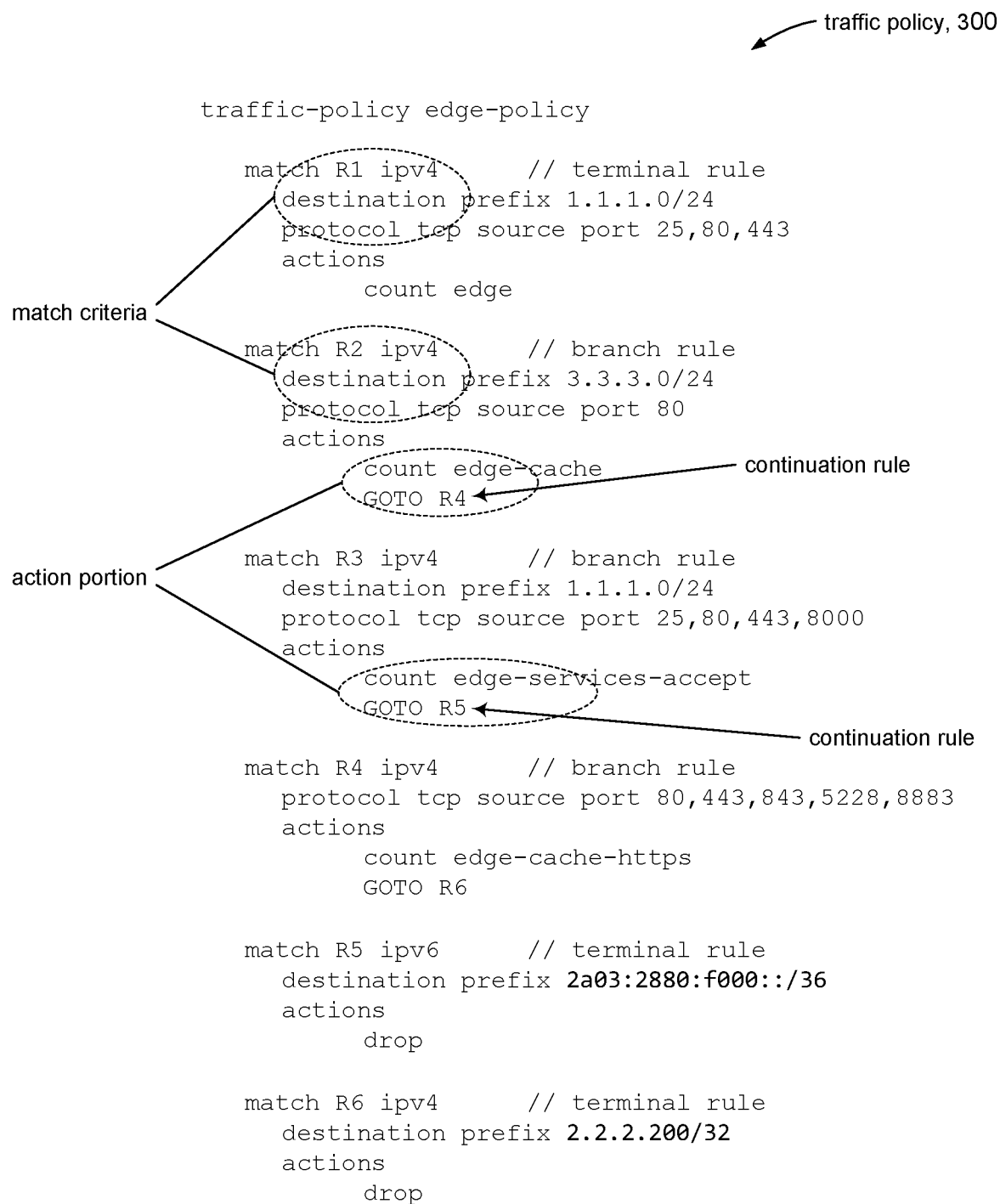
FIG. 3 shows a traffic policy in accordance with the present disclosure.

FIG. 3 shows an illustrative example of a traffic policy in accordance with the present disclosure. The syntax used to express the policy rules comprising traffic policy 300 is illustrative and used for discussion purposes to point out aspects of a traffic policy in accordance with the present disclosure. It will be appreciated that the specific syntax used to express a traffic policy may vary from one embodiment of the present disclosure to another.

The illustrative traffic policy shown in FIG. 3 comprises six policy rules R1 to R6. Policy rules are generally defined and managed by a human user and so are expressed with alphanumeric characters, whereas the packet filters are represented in binary ('0' and '1') because they are stored in memory (e.g., TCAM) and processed by packet processing hardware. The difference between policy rules and packet filters is analogous to the difference between computer source code and executable binary code.

Policy rules are known. Briefly, a policy rule comprises two components: a match criteria component and an actions component. The match criteria can specify data fields in a packet, including the packet headers and the payload. The match criteria can include combinations of data such as source and destination Internet protocol (IP) addresses, source and destination media access control (MAC) addresses, protocol type, port numbers and so on. The actions component includes actions that are in connection with a packet, either directly (e.g., drop the packet, redirect the packet, rewrite portions of the packet, and so on) or indirectly (e.g., increment counters, log messages, and so on).

FIG. 3 shows that a policy rule, in accordance with the present disclosure, can be a "terminal" rule (e.g., policy rules R1, R5, and R6) or a "branch" rule (e.g., policy rules R2, R3, R4). A branch rule includes a branch action in the action component of the rule, while a terminal (non-branch) rule does not include a branch action. In some embodiments, for example, the branch action can be expressed using a GOTO token and a corresponding label; the label specifies another policy rule in the traffic policy, which can be referred to herein as the "continuation rule." For example, the action component of rule R2 includes a GOTO action that specifies branching to rule R4 as the continuation rule; likewise rule R3 includes a GOTO action to rule branch to (continuation) rule R5. In some embodiments, continuation rules are lower priority than the branch rule in which they are specified.

The logical execution order for classifying packets in accordance with the policy rules in a traffic policy includes executing rules in order of priority, from highest priority to lowest priority. As mentioned above, priority is established by the order in which the rules are listed in the traffic policy; the first rule in the traffic policy is the highest priority rule, the last rule in the traffic policy is the lowest priority rule. Where the rules include both terminal rules and branch rules, the logical execution order is further determined according to the following semantics for terminal rules and branch rules:

Policy rules are prioritized in that the first rule in the traffic policy (e.g., R1) is deemed to have highest priority; subsequent rules in the list have lower priority than earlier rules in the list. The last rule in the traffic policy (e.g., R6) is deemed to have lowest priority. Logically, the traffic policy classifies a packet by matching each rule against the contents of the packet, in sequential order, starting with the first rule in the list. The rule in the traffic policy that matches the packet is said to be "hit."

If the packet hits on a terminal rule, the action(s) associated with the terminal rule will be performed and packet classification terminates.

If the packet hits on a branch rule, the action(s) associated with the branch rule can be delayed. Packet classification continues; the packet is compared against the continuation rule specified in the GOTO action of the branch rule. Four outcomes are possible:

The continuation rule: (1) is another branch rule and (2) matches the packet.

For this outcome, non-branching action(s) associated with the continuation rule are delayed along with any previously delayed actions, and the classification process continues with the continuation rule specified in the GOTO action of the branch rule.

The continuation rule: (1) is a terminal rule (not another branch rule) and (2) matches the packet.

For this outcome, both non-branching action(s) in the continuation rule and any previously delayed actions are performed and packet classification terminates.

The continuation rule: (1) is another branch rule and (2) does not match the packet.

For this outcome, actions in the continuation rule are not processed and the GOTO action is not taken. The classification process continues from the next lower priority rule, namely the rule right after the continuation rule, if it exists. Any previously delayed actions are delayed.

The continuation rule: (1) is a terminal rule (not another branch rule) and (2) does not match the packet.

For this outcome, any previously delayed actions are processed. Actions associated with the terminal continuation rule are not processed and packet classification terminates.

Some examples will now be described to illustrate the above-described classification of a packet according to the semantics of terminal and branch rules in traffic policy 300.

EXAMPLE 1

Hit on Rule R1 (Terminal Rule)

Consider the simple case of rule R1. Policy rule R1 matches IPv4 packets that have a destination IP address in the range specified by the prefix 1.1.1.0/24 and a source port set to 25, 80, or 443. Accordingly, rule R1 will match a packet having:

destination IP (DIP)=1.1.1.128 and source port=80.

Because rule R1 is a terminal rule, the rule is applied in connection with the packet (e.g., incrementing a counter called EDGE) and packet classifying with traffic policy 300 terminates. It will be appreciated, however, that the packet may be subject to classification by other traffic policies further down the packet processing pipeline.

EXAMPLE 2

Hit on Rule R3 (Single Branch Rule)

Policy rule R3 matches IPv4 packets that have a destination IP address covered by the prefix 1.1.1.0/24 and a source port set to 25, 80, 443, or 8000. Accordingly, a packet having:

DIP=1.1.1.64 and source port=8000 will be matched by rule R3. Because rule R3 is a branch rule, the non-branching actions in R3, namely incrementing the EDGE-SERVICES-ACCEPT counter, will be delayed and packet classification continues. The packet will be compared to the continuation rule specified in the GOTO action, namely policy rule R5. There are two outcomes of the comparison with R5 to consider:

Outcome 1, where rule R5 matches the packet. Because R5 is a terminal rule, all previously delayed actions (in this example increment counter EDGE-SERVICES-ACCEPT) would be performed and the action associated with R5, in this case DROP the packet, would be performed. Further, because R5 is a terminal rule, packet classification with traffic policy 300 would terminate and the packet would proceed down the pipeline for further processing.

Outcome 2, where R5 does not match the packet. The "drop" action in R5 is not performed. The previously delayed action(s), in this example increment counter EDGE-SERVICES-ACCEPT, are delayed, and processing continues with attempting to match the rule following R5, namely R6. Because R6 is the lowest priority rule, packet classification with traffic policy 300 would terminate after processing R6, and the packet would proceed down the pipeline for further processing.

EXAMPLE 3

Hit on Rule R2 (Chained Branch Rules)

Policy rule R2 matches IPv4 packets that have a destination IP address in the range 3.3.3.0/24 and a source port of 80. Accordingly, R2 will match a packet having:
DIP=3.3.3.32 and source port=80.

Because R2 is a branch rule, the increment action on the EDGE-CACHE counter will be delayed, and packet classification continues. The packet will be compared to the continuation rule specified in the GOTO action, namely policy rule R4. There are two outcomes from comparing the packet to R4 to consider:

Outcome 1, where R4 matches the packet. Because R4 is another branch rule, non-branching actions associated with R4, namely increment EDGE-CACHE-HTTPS, will be delayed. At this point, the list of delayed actions would include:
increment EDGE-CACHE
increment EDGE-CACHE-HTTPS.

Packet classification continues, and the packet would be compared to the continuation rule specified in the GOTO action of R4, namely policy rule R6 (described below).

Outcome 2, where R4 does not match the packet. The action in R4 is not performed. Moreover, the branch in R4 is not taken. Processing continues with the next rule, namely, R5. If R5 matches the packet, both the actions of R5 and the list of delayed actions, namely increment EDGE-CACHE, would be performed; packet classification with traffic policy 300 would terminate and the packet would proceed down the pipeline for further processing. Otherwise, processing continues with the next rule, namely, R6.

There are two outcomes from comparing the packet to R6 to consider:

Outcome 1, where R6 matches the packet. Because R6 is a terminal rule, all previously delayed action(s) would be performed. In addition, the action associated with R6 would be performed. Because R6 is a terminal rule, packet classification with traffic policy 300 would terminate and the packet would proceed down the pipeline for further processing.

Outcome 2, where R6 does not match the packet. Because R6 is a terminal rule, all previously delayed action(s) would be performed. However, because R6 does not match the packet, the action(s) associated with R6 would not be performed. Further, because R6 is a terminal rule, packet classification with traffic policy 300 would terminate and the packet would proceed down the pipeline for further processing.

The foregoing examples describe the execution flow (execution order) in connection with terminal policy rules and branch policy rules. As explained above, the policy rules in a traffic policy can be compiled to produce a list of packet filters (e.g., compiled rules 126) that can then be downloaded and programmed into a packet processor. A TCAM performs a single lookup for a packet to output a single packet filter and as such does not support being able to branch from one filter to another filter. When a traffic policy is compiled in accordance with the present disclosure, the resulting list of packet filters nonetheless preserve the branch semantics (behavior) of any branch rules in the traffic policy.

Figure 4A:
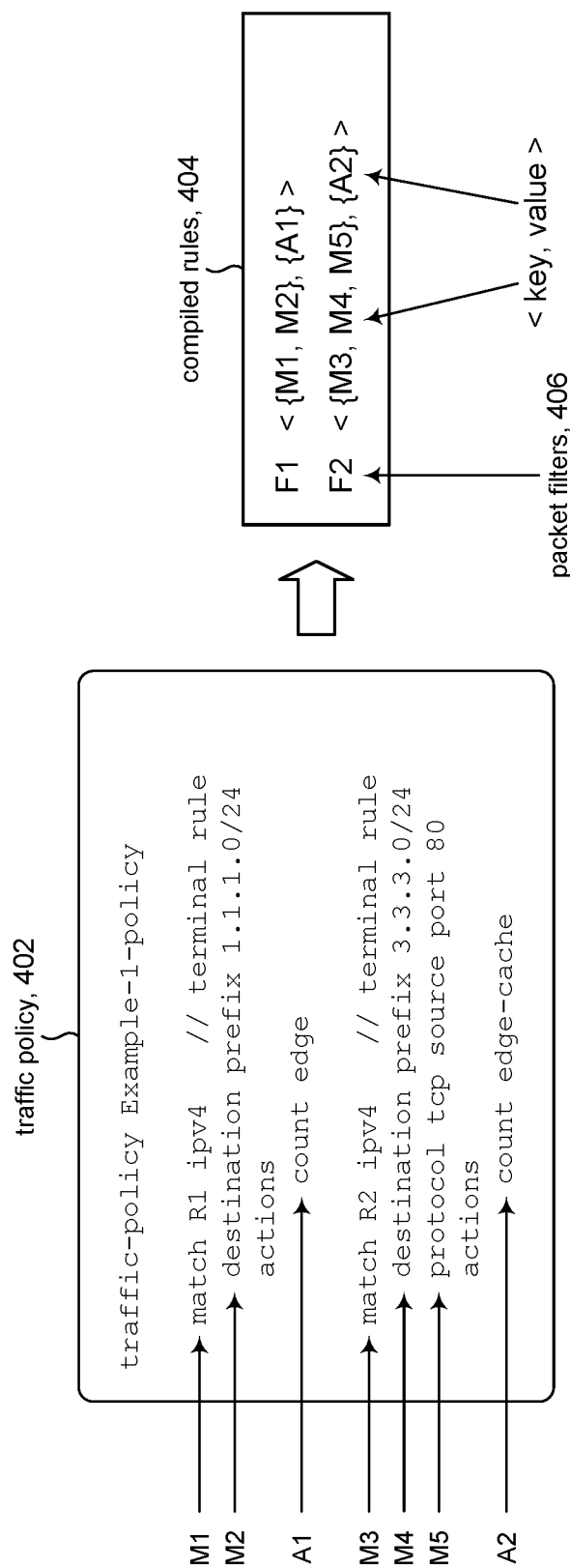
FIGS. 4A, 4B, 4C show examples of traffic policies and corresponding compiled rules in accordance with the present disclosure.
Figure 4B:
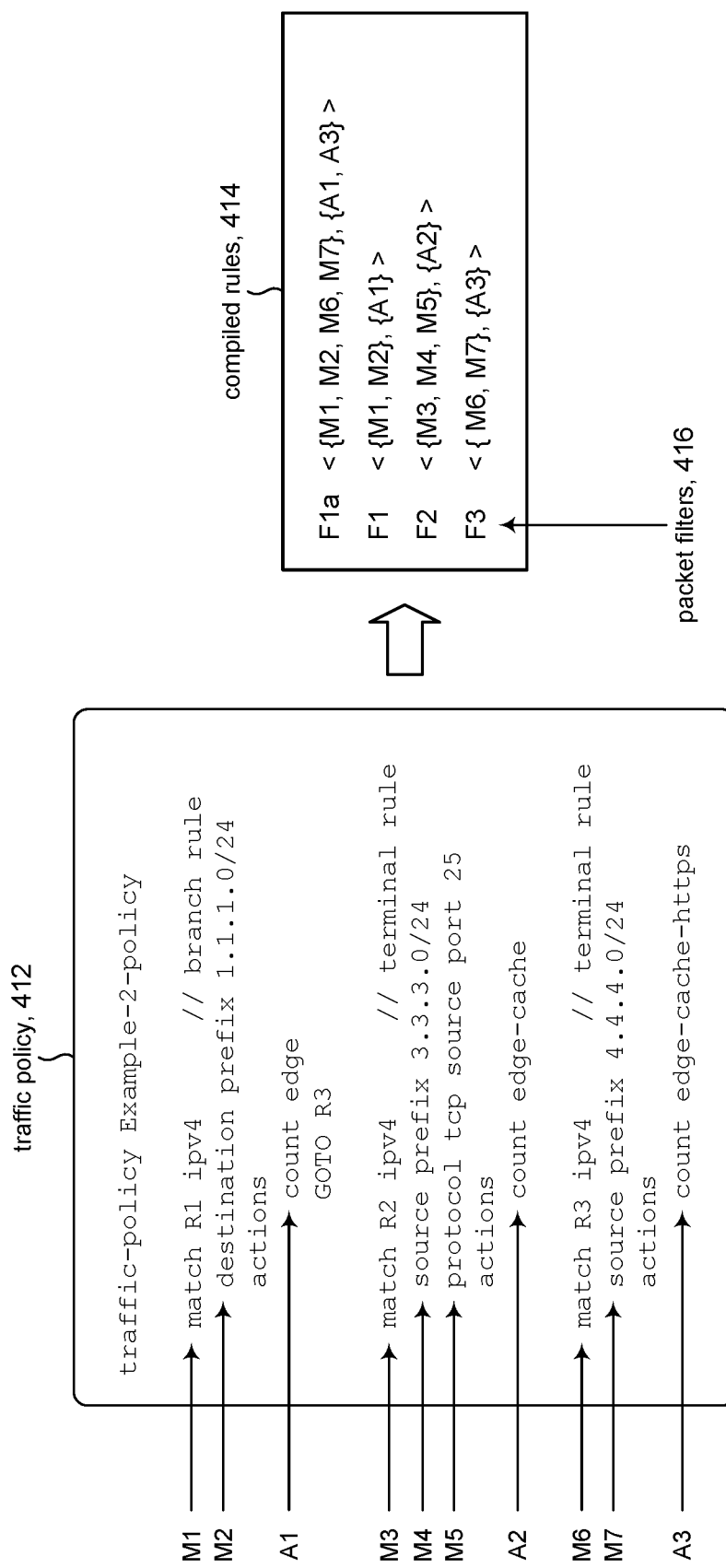
Figure 4C:
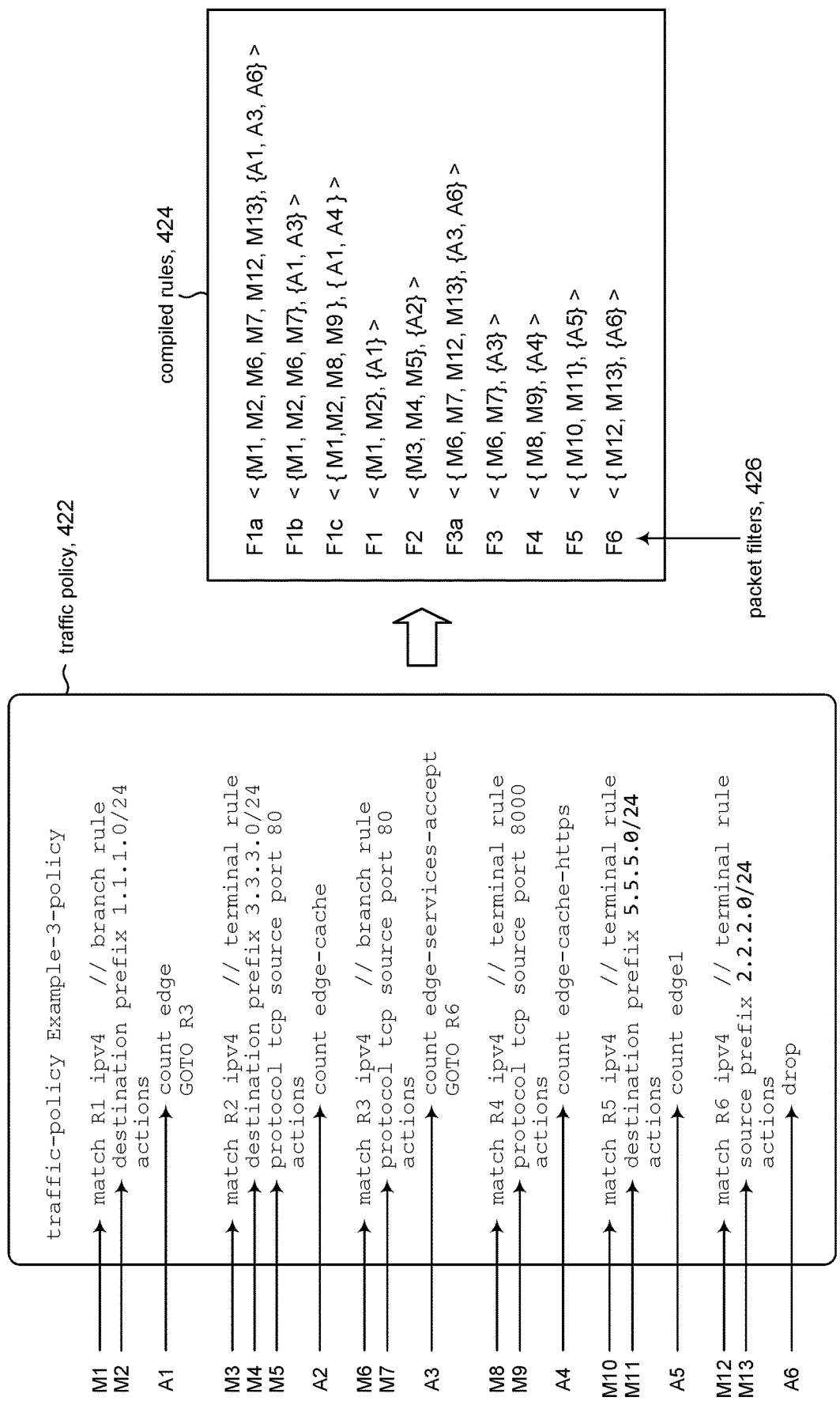

FIGS. 4A to 4C illustrate examples of traffic policies and corresponding packet filters. Traffic policy 402 in FIG. 4A, for example, comprises two terminal policy rules R1, R2. Compiled rules 404 is a representation of the list of packet filters (<key, value> pairs) 406 generated from traffic policy 402 that can be stored in a given TCAM. Each packet filter in compiled rules 404 can be a <key, value> pair comprising a set of one or more match criteria (key) and a set of one or more actions (value). For example, policy rule R1 matches IPv4 packets having a destination IP address in the block of addresses specified by 1.1.1.0/24. The key component in the corresponding packet filter F1 comprises a set of match criteria M1, M2, where M1 represents the IPv4 match criterion and M2 represents the 1.1.1.0/24 match criterion in a data format suitable for the given TCAM. The value component (action set) of packet filter F1 is a set containing one action A1 which represents the action specified in policy rule R1, namely "count edge."

Likewise, policy rule R2 matches packets according to the following match criteria:
packet is IPv4 (M3) AND
destination IP is in the range 3.3.3.0/24 (M4) AND
source port is 80 (M5).

The corresponding <key, value> pair of packet filter F2 comprises:
key={M3, M4, M5}
value={A2}

FIG. 4B shows an example of a traffic policy that includes a branch policy rule. Policy rule R1 in traffic policy 412, for example, includes the branch action "GOTO R3." Compiled rules 414 comprise corresponding packet filters 416 generated in accordance with the present disclosure. For example, policy rules R1, R2, R3 correspond to packet filters F1, F2, F3. The GOTO action in rule R1 does not represent an action that is performed in connection with a packet, but rather specifies another rule to match against a packet. Recall from above, however, that in some embodiments TCAMs are configured to perform a lookup operation in a single pass through their memory (e.g., for high throughput), and as such are not configured for an additional pass to process the GOTO action. Accordingly, while the set of actions in packet filter F1, represent the actions of rule R1 (action A, "count edge"), filter F1 excludes the branch action that corresponds to "GOTO R3" in rule R1.

In accordance with the present disclosure, compiled rules 414 includes an additional packet filter F1a that represents execution of the GOTO action without having to refer to another packet filter. The <key, value> pair comprising filter F1a and the position of filter F1a in the list of packet filters are determined in accordance with the present disclosure so as to preserve the branch semantics of the GOTO action without requiring an additional pass in the TCAM. The following description will bear this out.

Consider first classification of the following packets using traffic policy 412:
  Packet 1—IPv4, source IP=5.5.5.12; destination IP=1.1.1.10
  Packet 2—IPv4, source IP=4.4.4.32; destination IP=1.1.1.128
  Packet 3—IPv4, source IP=4.4.4.64; destination IP=2.2.2.138
  Packet 1—R1 will match Packet 1 and so processing will continue with R3 by way of the "GOTO R3" action. R3 will not match Packet 1; action A1 will be applied in connection with Packet 1, and processing of traffic policy 412 terminates.
  Packet 2—R1 will match Packet 2 and so processing will continue with R3 by way of the "GOTO R3" action. R3 will match Packet 2; action A1 will be applied in connection with Packet 2 followed by action A3, and processing of traffic policy 412 terminates.
  Packet 3—R1 will not match Packet 3, nor will R2. R3 will match Packet 3; action A3 will be applied in connection with Packet 3, and processing of traffic policy 412 terminates.

Consider now the operation of packet filters 416 with respect to Packets 1, 2, and 3, keeping in mind that a single pass is made through the TCAM and the TCAM will output a single filter:
  Packet 1—F1a, F1, and F3 will match Packet 1. However, F1a will hit because it has the highest priority among F1a, F1, and F3. Accordingly, the TCAM will output packet filter F1a and actions A1 and A3 will be applied.
  Packet 2—Only F1 will match, and so the TCAM will output packet filter F1 and action A1 will be applied.
  Packet 3—Only F3 will match, and so the TCAM will output packet filter F3 and action A3 will be applied.
It can be seen from the above discussion that although packet filters 416 do not contain branch actions nor specify other packet filters, they nonetheless can represent the branch behavior in traffic policy 412. In particular, the branch action semantics of policy rule R1 is represented by the packet filters by virtue of the addition of packet filter F1a and its placement in the list of packet filters.

FIG. 4C shows an example of chained branch rules in a traffic policy. Policy rules R1 and R3 in traffic policy 422, for example, are "chained" in that one branch rule (R3) follows another branch rule (R1). Compiled rules 424 comprise the packet filters 426 that represent the policy rules in traffic policy 422, including the semantics of the chained branch rules in the traffic policy. Consider, for example, processing the following packets in accordance with traffic policy 422:
  Packet 1—IPv4, src IP=2.2.2.32, dst IP=1.1.1.10, next protocol=TCP, source port=80
  Packet 2—IPv4, src IP=4.4.4.28, dst IP=1.1.1.25, next protocol=TCP, source port=80
  Packet 3—IPv4, src IP=2.2.2.28, dst IP=6.6.6.25, next protocol=TCP, source port=80
  Packet 4—IPv4, src IP=4.4.4.28, dst IP=6.6.6.25, next protocol=TCP, source port=80
  Packet 5—IPv4, src IP=*, dst IP=1.1.1.30, next protocol=TCP, source port=8000
  Packet 1 will match policy rule R1, then continue to and match R3, and then continue to and match R6. Accordingly, actions A1, A3, and A6 will be applied.
  Packet 2 will match policy rule R1, then continue to and match R3, and then continue to but NOT match R6. Accordingly, actions A1 and A3 will be applied.
  Packet 3 will match policy rule R3 and then continue to, and match, R6. Accordingly, actions A3 and A6 will be applied.
  Packet 4 will match policy rule R3 and then continue to, but NOT match, R6. Accordingly, action A3 will be applied.
  Packet 5 will match policy rules R1 and then continue to R3, but will not match R3 and processing to continue with the next lower priority rule, namely R4. The '*' in the source IP indicates a wildcard.

Consider now the operation of packet filters 426 on Packets 1, 2, 3, and 4, keeping in mind that a single pass is made through the TCAM and the TCAM will output a single filter:
  Packet 1—F1a, F1b, F1, F3a, F3, and F6 will match Packet 1. However, F1a will hit because it has the highest priority among F1a, F1b, F1, F3a, F3, and F6. Accordingly, the TCAM will output packet filter F1a and actions A1, A3, and A6 will be applied.
  Packet 2—F1b, F1, F3a and F3 will match Packet 2. However, F1b will hit because it has the highest priority among F1b, F1, F3a and F3. Accordingly, the TCAM will output packet filter F1b and actions A1 and A3 will be applied.
  Packet 3—F3a, F3, and F6 will match Packet 3. However, F3a will hit because it has the highest priority among F3a, F3, and F6. Accordingly, the TCAM will output packet filter F3a and actions A3 and A6 will be applied.
  Packet 4—Only F3 will match, and so the TCAM will output packet filter F3 and action A3 will be applied
  Packet 5—F1c, F1, and F4 will match Packet 5. However, F1c will hit because it has the highest priority among F1c, F1, and F4. Accordingly, the TCAM will output packet filter F1c and actions A1 and A4 will be applied.

Figure 5:
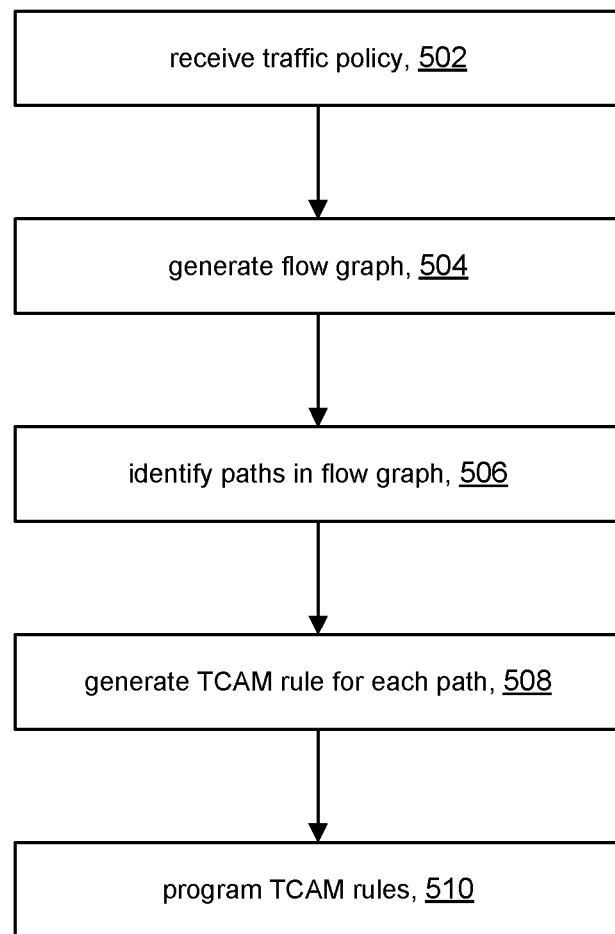
FIG. 5 shows a flow of operations for compiling a traffic policy in accordance with the present disclosure.
Figures 6, 7:
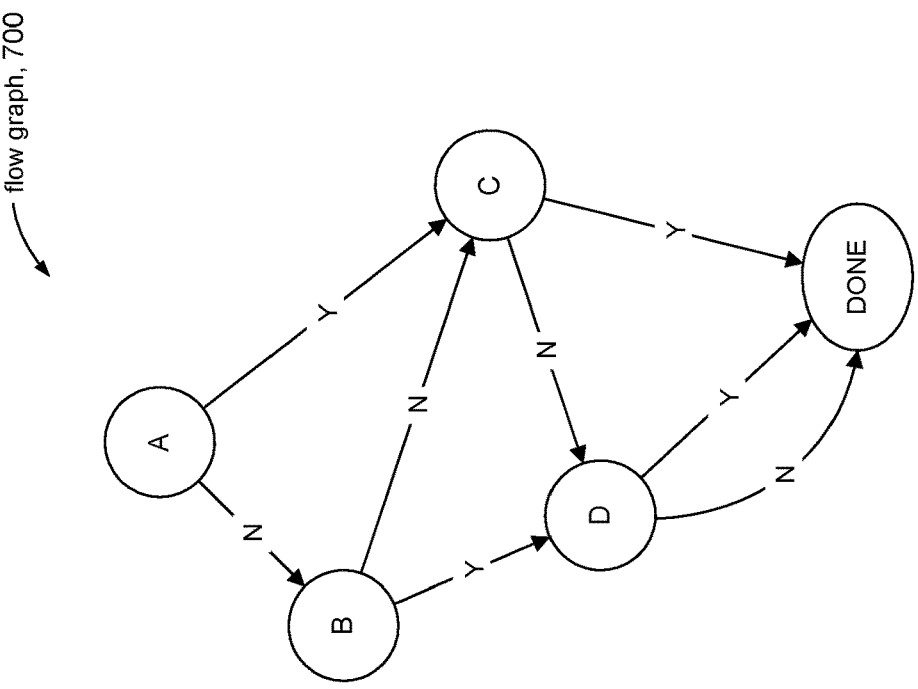
FIG. 6 shows an illustrative example of a traffic policy to explain FIG. 5.
FIG. 7 shows a flow graph based on the traffic policy shown in FIG. 6.

Referring to FIGS. 5, 6, and 7, the discussion will now turn to a high-level description of processing in a network device (e.g., 100, FIG. 1) for generating packet filters from a traffic policy in accordance with some embodiments of the present disclosure. FIGS. 6 and 7 illustrate the operations using a simple traffic policy. Traffic policy 600 in FIG. 6 includes branch rules where the semantics of a branch rule allows for multiple rules that match a packet to be applied in connection with the packet. In some embodiments, the network device can include one or more digital processing units, which when operated, can cause the network device to perform processing in accordance with FIG. 5. Digital processing units can include general CPUs in the control plane that operate by way of executing computer program code stored on a non-volatile computer readable storage medium (e.g., read-only memory); for example, CPU 102 (FIG.1) in the control plane can be a general CPU. The flow of operations performed by the network device is not necessarily limited to the order of operations shown.

Operation 502 The network device can receive a traffic policy. In some embodiments, for example, the network device can be configured with a user interface to allow a user to create a new traffic policy or manage an existing traffic policy. In other embodiments, the network device can communicate with a central controller to receive a traffic policy from the central controller. The received traffic policy can be stored locally in the network device (e.g., solid state drive, SSD) and processed by the network device. In accordance with the present disclosure, the traffic policy may include one or more branch rules.

Operation 504 The network device can scan the policy rules in the traffic policy to generate a flow graph. Referring to FIGS. 6 and 7 for an illustrative example, traffic policy 600 shown in FIG. 6 consists of a list of four policy rules A, B, C, D. Rules A and B are branch rules. In accordance with some embodiments, flow graph 700 in FIG. 7 can be generated from traffic policy 600 as follows:

- Each policy rule in the traffic policy has a corresponding node in the flow graph. A 'Y' branch and a 'N' branch connect the node to another node. The Y branch indicates the policy rule matches an input packet to be processed according to the traffic policy. As noted above, the input packet can be an ingress packet received by the network device or an egress packet to be transmitted by the network device. The N branch indicates a non-match with the input packet, so processing continues with the node that corresponds to the next policy rule in the traffic policy.
- All rule nodes lead to a DONE node, which represents termination of the traffic policy.
- Terminal policy rule. The Y branch of a node that corresponds to a terminal rule leads directly to the DONE node to indicate that the traffic policy terminates with respect to the input packet when a terminal policy matches a packet; no further rules in that traffic policy are matched. The N branch of the node connects to a node that corresponds to the next policy rule. See, for example, policy rule C in traffic policy 600 and corresponding node C in flow graph 700; if an input packet does not match rule C, then the next policy (rule D) is compared. Action(s) associated with a terminal policy rule are not represented in the flow graph, but can be inferred; if the rule is matched then the action(s) are applied in connection with the packet and if the rule is not matched then the action(s) are not applied.
- Branch policy rule. The Y branch of a node that corresponds to a branch rule connects that node to a node that corresponds to the continuation rule (FIG. 3) specified in the GOTO action. See, for example, policy rule A in traffic policy 600 and corresponding node A in flow graph 700. The N branch (branch rule is not matched) connects to a node in the flow graph that corresponds to the next policy rule. Action(s) associated with a branch policy rule are not represented in the flow graph, but can be inferred. In accordance with some embodiments, for example, if the rule is matched then the action(s) are accumulated and applied when a terminal rule is reached; if the rule is not matched then the action(s) are not accumulated.

Operation 506 Continuing with FIG. 5, the network device can identify paths in the flow graph. In some embodiments, flow paths can be identified using a traversal strategy that is loosely based on a depth first traversal as follows:

- Find all paths from the root node (A) to the leaf node (DONE).
- Paths are traversed, where traversal priority is given to Y edges over N edges. Referring again to flow graph 700 (FIG. 7), the first path that is traversed is A to C to DONE because we traverse from A (root node) to DONE (leaf node) along the Y edges first. The next path is A to C to D to DONE: traverse A to C on the Y edge, then C to D on the N edge, then D to DONE on the Y edge. Continuing with this sequence leads to the following list of prioritized paths:
  1. A-y->C-y->DONE
  2. A-y->C-n->D-y->DONE
  3. A-y->C-n->D-n->DONE
  4. A-n->B-y->D-y->DONE
  5. A-n->B-y->D-n->DONE
  6. A-n->B-n->C-y->DONE
  7. A-n->B-n->C-n->D-y->DONE
  8. A-n->B-n->C-n->D-n->DONE In each path, remove (skip) from the path nodes that have an outgoing N edge. Referring to path #2 in the list above, for example, the C node is removed because the C node has an outgoing N edge. Likewise, in path #3, the C and D nodes are removed because each has an outgoing N edge. Continuing with this strategy of removing outgoing N edges leads to the final list of paths below. Path #8 (above) is removed from the list because it becomes empty after removing all nodes in the path that have outgoing N edges, namely nodes A, B, C, D:
1. A->C->DONE
2. A->D->DONE
3. A->DONE
4. B->D->DONE
5. B->DONE
6. C->DONE
7. D->DONE Operation 508 The network device can generate a packet filter (TCAM rule) based on each path in the flow graph. Summarizing up to this point, in accordance with some embodiments, a traffic policy (e.g., 600) can be scanned and analyzed to produce a corresponding flow graph (e.g., 700). Each node in the flow graph corresponds to a policy rule in the traffic policy. The flow graph represents the execution order through the traffic policy when packets are processed, from the first (highest priority) rule to the last (lowest priority) rule. The nodes in the flow graph are connected by Y and N edges, which represent when a match occurs (Y) or does not occur (N) with a given input packet. The above final list of paths represents a layout of packet filters that preserves the execution order of the traffic rules. In some embodiments, a packet filter can be generated from these paths according to the following formation guidelines:

- Single-node Path (excluding the DONE node)-The key component of the packet filter (FIG. 4A) comprises the match criteria of the policy rule that corresponds to the one node. The value component of the packet filter comprises the action(s) of that policy rule. Consider path #3, for example, which has a single node A. The packet filter generated from path #3 can be represented by the following <key, value> pair:
  <{SRC="1.1.1.1"}, {COUNT ACC-A}>
  As another example, single-node path #5 would produce;
  <{PROT==6 &&SRC_PORT==1}, {COUNT ACC-B}>
- Multi-node Path (not counting the DONE node)—The key component of the packet filter comprises an intersection of the respective match conditions of the corresponding nodes, and the value component comprises a union of the respective actions of the corresponding nodes. Consider multi-node path #1, for example, comprising nodes A and C:
  node A: <{SRC="1.111"}, {COUNT ACC-A}> node C: <{PROT==6 && DST_PORT==2}, {COUNT ACC-C}>

To facilitate an explanation for computing the intersection of the key components, we expand nodes A and C as follows so that there is a one-to-one correspondence between the match criteria:

node A: <{SRC=="1.1.1.1" && PROT==ANY && DST_PORT==ANY}, {COUNT ACC-A}>
node C: <{SRC==ANY && PROT==6 && DST_PORT==2}, {COUNT ACC-C}>

The 'ANY' terms represent match-all wildcards. For example, node A does not specify a next protocol (PROT) or a destination port (DST_PORT), so this is equivalent to expressing node A as matching on a packet having source IP==1.1.1.1 and "any" next protocol (PROT==ANY) and "any" destination port (DST_PORT==ANY). Accordingly, The intersection of the match criteria of A and C can be computed by taking the intersection of the corresponding match criteria:

SRC=="1.1.1.1"∩SRC==ANY->SRC=="1.1.1.1"
PROT==ANY∩PROT==6->PROT==6
DST_PORT==2∩DST_PORT==2->DST_PORT==2
to yield:
{(SRC=="1.1.1.1" && PROT==ANY) && (PROT==6 && DST_PORT==2)}, The union of the actions of A and C can be expressed as: {COUNT ACC-A, COUNT ACC-C}.

The packet filter for path #1 can be represented by the following <key, value> pair:
<{SRC=="1.1.1.1" && PROT==6 && DST_PORT==2}, {COUNT ACC-A, COUNT ACC-C}>

Based on the foregoing guidelines, the following packet filters can be generated from paths 1-7 above:
1. <{SRC=="1.1.1.1" && PROT==6 && DST_PORT==2}, {COUNT ACC-A, COUNT ACC-C}>
2. <{SRC=="1.1.1.1" && DST=="2.2.2.2"}, {COUNT ACC-A, COUNT ACC-D}>
3. <{SRC=="1.1.1.1"}, {COUNT ACC-A}>
4. <{PROT==6 && SRC_PORT==1 && DST=="2.2.2.2"}, {COUNT ACC-B, COUNT ACC-D}>
5. <{PROT==6 && SRC_PORT==1}, {COUNT ACC-B}>
6. <{PROT==6 && DST_PORT==2}, {COUNT ACC-C}>
7. <{DST=="2.2.2.2"}, {COUNT ACC-D}>

The above packet filters represent the semantics (execution order) of the terminal and branch rules in traffic policy 600.

Operation 510 The network device can install the packet filters in each of its packet processors (e.g., 112, FIG. 1). In some embodiments, the packet filters can be programmed in the TCAMs 114 of respective packet processors 112. Processing of a traffic policy in accordance with the present disclosure can be deemed complete.

The foregoing operations describe processing a traffic policy by a network device. It will be appreciated that in other embodiments, a central controller rather than a network device can process the traffic policy to generate the TCAM in accordance with the present disclosure. The TCAM rules can then be downloaded and programmed into the network device. In still other embodiments, the operations may be shared between a central controller and a network device.

FIG. 8 is a procedure expressed in pseudo code that sets forth an algorithm for compiling a traffic policy that contains branch policy rules, in accordance with another embodiment of the present disclosure. The procedure "GotoActionResolver" takes as input a "rulelist" which is the traffic policy (containing branch policy rules) to be compiled. Whereas the processing shown in FIG. 5 scans the list of policy rules starting from the top, the GotoActionResolver procedure in FIG. 8 processes a traffic policy starting from the lowest priority branch policy rule in the list and working up. Basically, for each branch rule, we define:

$R_c$—the current lowest priority branch policy rule being resolved $C=\{R_i, \ldots, R_n\}$—set of rules (terminal and branch) to be matched on after the GOTO action, where i is the priority of the branch rule containing the GOTO action. Because $R_c$ is the current lowest priority branch policy rule being resolved, it is guaranteed that the set C does not contain any branch rule, as they would have been resolved by a previous iteration of the decomposition algorithm.

$N=\{R_{skipped-1}, \ldots, R_{skipped-N}\}$—set of rules between $R_c$ and $R_i$ which are skipped if a packet hits the branch rule.

For each rule in C, we DECOMPOSE the rule into two sets of rules (intersection rules and difference rules) as follows:

$C_{int}=\{IR(R_k, R_c)$ for k in range([i, n])}—set of intersection rules, sorted by priority i to n, $C_{diff}=\{R_k \backslash IR(R_k, R_c)$ for k in range([i, n])}—set of difference rules, sorted by priority i to n.

An intersection rule $IR(R_a, R_b)$ for rules $R_a, R_b$ is a rule defined according to the following formal definition:

Rules can be viewed as being composed of d fields. Rules can be geometrically represented as a prioritized collection of hyper-rectangles in a d-dimensional Euclidean space. A packet is a point in this space. Let R[i] represent the $i^{th}$ field in R (i ranges from 1 to d). $IR(R_a, R_b)$ is defined as $R_a \cap R_b = \{Ra[i] \cap Rb[i], \forall i\}$, where, if $Ra[i] \cap Rb[i]$ is a null set for some i, then $IR(R_a, R_b)$ is deemed empty.

Stated less formally, the intersection rule $IR(R_a, R_b)$ for rules $R_a, R_b$, is a rule comprising the minimum set of match criteria from $R_a$ and $R_b$ that matches a packet that would also be matched by $R_a$ and by $R_b$. For example, suppose we have:

policy rule $R_a$: source IP 10.0.0.0/8 && source port 100
policy rule $R_b$: source IP 10.0.0.0/24 && source port 100-110, then $IR(R_a, R_b)$ is:
source IP 10.0.0.0/24 && source port 100.

The source IP address 10.0.0.0/24 is common to both rules; the IP address is explicit in $R_b$ and is included in the range of IP addresses in $R_a$. The source port 100, likewise, is common to both rules: it is explicit in $R_a$ and is included in the range of source ports in $R_b$.

A difference rule $R_a \backslash IR(R_a, R_b)$ for rules $R_a, R_b$ is a rule comprising match criteria that includes all match criteria in $R_a$ that are not in $IR(R_a, R_b)$. As the name of the rule suggests, the difference rule can be viewed as a rule that results from "subtracting" out $IR(R_a, R_b)$. Using the example policy rules $R_a, R_b$ above, $R_a \backslash IR(R_a, R_b)$ specifies:
source IPs in 10.0.0.0/8 (excluding source IPs in 10.0.0.0/24) && source port 100.

A containment criterion is met when the union of IR(m, c) for all m visited so far is equal to Rc. Essentially, this means the continue-rule space has been fully covered and we can stop decomposing lower priority rules. For simplicity, we can fall through and continue processing until we hit a lower priority rule which fully covers Rc. Note that the last rule is a catch-all rule and will always cover Rc.

FIGS. 9A and 9B illustrate an example of compiling a traffic policy in accordance with the algorithm of FIG. 8, where original traffic policy 900 in FIG. 9A includes a branch rule R1 that does not skip any rules. The continuation rule specified by the GOTO action immediately follows the branch rule. The figures use the following notation, where the set of actions is represented by brackets ([ ... ]) and the set of match criteria is represented by braces ({ ... }). FIG. 9B shows the decomposition of R2 and R3 with respect to R1 which produces the intersection and different rules. The intersection rules represent the execution order from branch rule R1 when R1 matches a packet. The difference rules represent the execution order from branch rule R1 when R1 does not match a packet. The result is flattened rules list 902 which represents the execution order of the original traffic policy, but without the GOTO action. The rules comprising the flattened-rules list can be compiled into corresponding packet filters, which can then be programmed into a TCAM.

FIGS. 10A and 10B illustrate an example of compiling a traffic policy in accordance with the algorithm of FIG. 8, where original traffic policy 1000 in FIG. 10A includes a branch rule R1 that skips a rule. The continuation rule specified by the GOTO action is separated from the branch rule by at least one terminal rule. FIG. 10B shows that the decomposition of R3 and R4 with respect to R1 produces intersection rules that represent the execution order from branch rule R1 when R1 matches a packet. The difference rules represent the execution order from branch rule R1 when R1 does not match a packet. Flattened rules list 1002 represents the execution order of the original traffic policy, but without the GOTO action. The flattened rules list can be compiled to produce a set of corresponding packet filters, which can then be programmed into a TCAM.

Figure 11A:
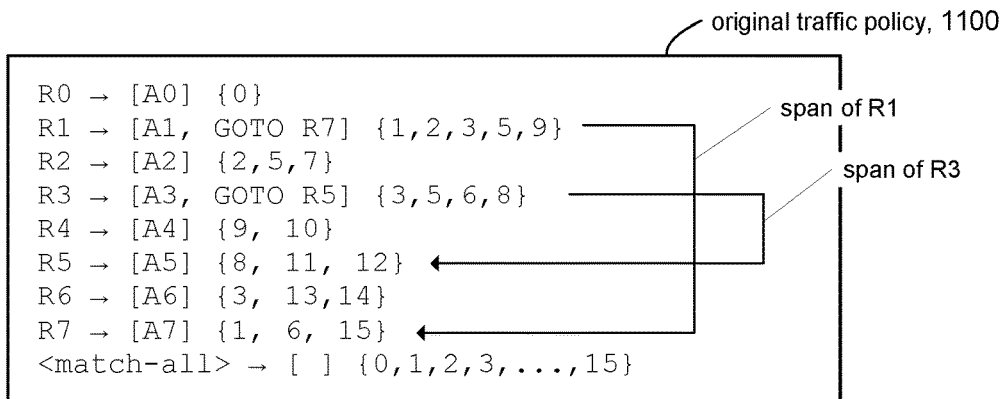
FIGS. 11A and 11B show yet another illustrative example of processing a traffic policy in accordance with FIG. 8.
Figure 11B:
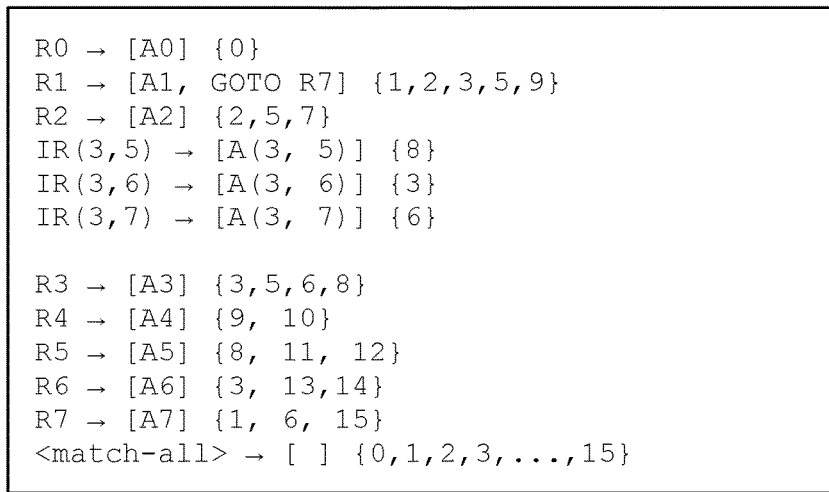
Figure 11C:
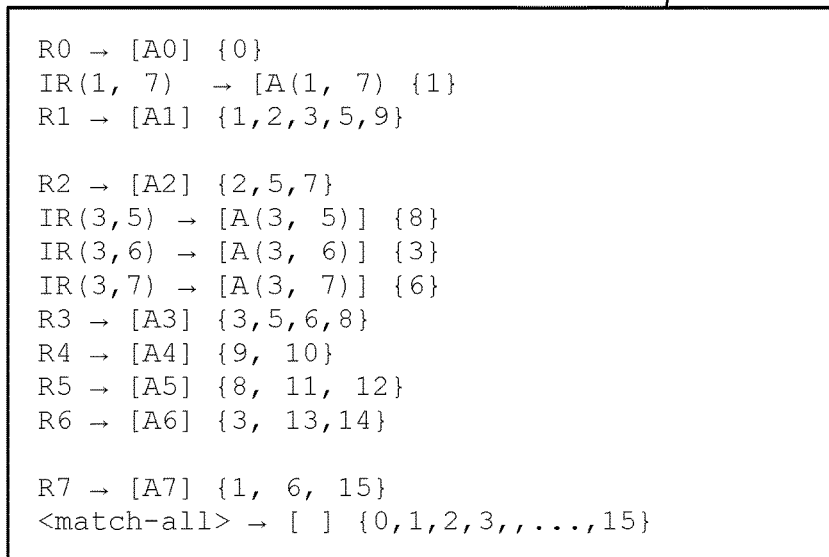

FIGS. 11A, 11B, 11C illustrate an example of compiling a traffic policy in accordance with the algorithm of FIG. 8, where original traffic policy 1100 in FIG. 11A includes branch rules R1, R3 with continue destinations that overlap. The span of the GOTO action of R1 overlaps the span of the GOTO action of R3. FIG. 11B shows a first iteration through the WHILE loop in FIG. 8 to resolve the lowest priority rule with a GOTO action, namely R3. FIG. 11C shows the results of the second iteration through the while loop to resolve the next higher priority rule with a GOTO action, namely R1. The result is flattened rules list 1104 which represents the execution order of the original traffic policy, but without the GOTO actions. The flattened rules list can be compiled to produce a set of corresponding packet filters, which can then be programmed into a TCAM.

Figure 12A:
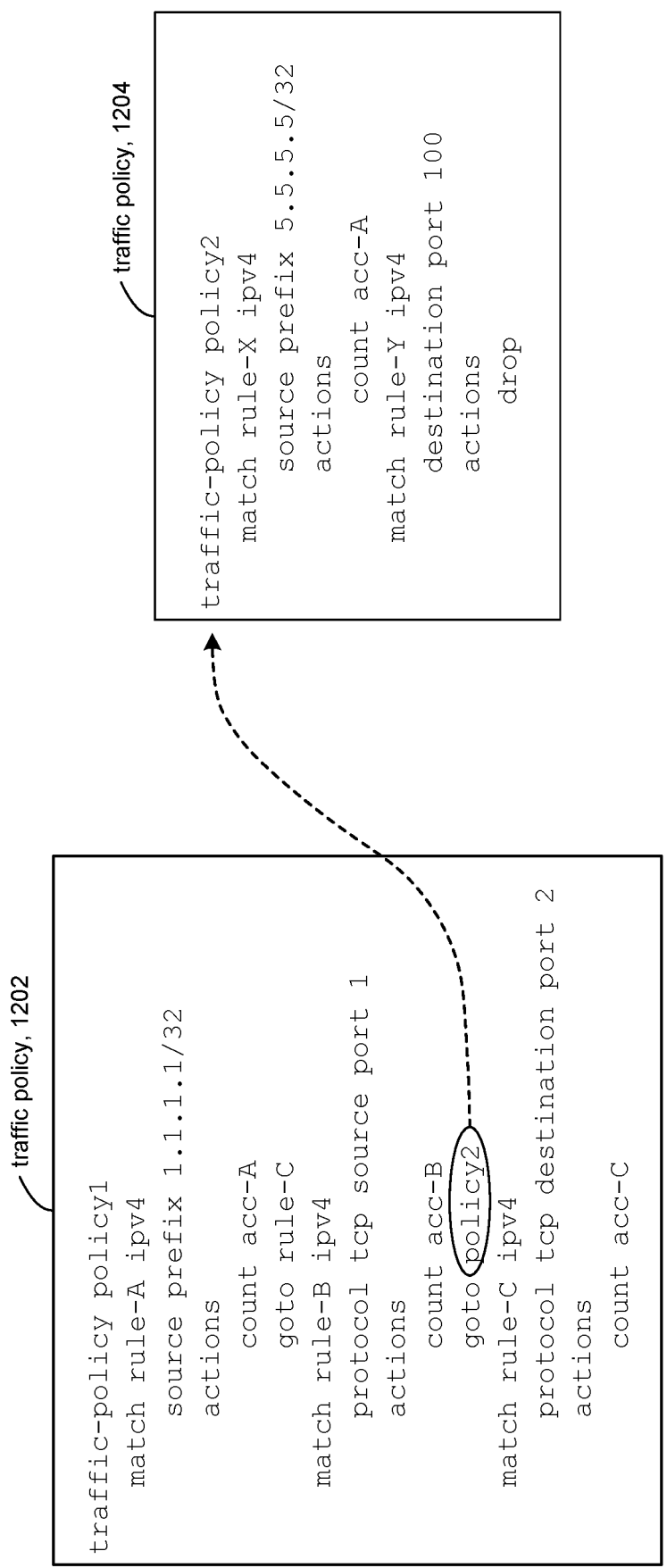

Referring to FIGS. 12A and 12B, in some embodiments, the GOTO action of a branch rule in a given traffic policy can reference a completely separate traffic policy instead of another rule within the given traffic policy. Traffic policy 1202, for example, includes branch rule RULE-B having a GOTO action that references traffic policy 1204. When traffic policy 1202 is compiled, the rules in the referenced traffic policy 1204 can be logically appended to the bottom of traffic policy 1202 as shown in the logical representation in FIG. 12B. The traffic policy referenced in the GOTO action is logically replaced with the first rule in the referenced traffic policy.

Figure 13:
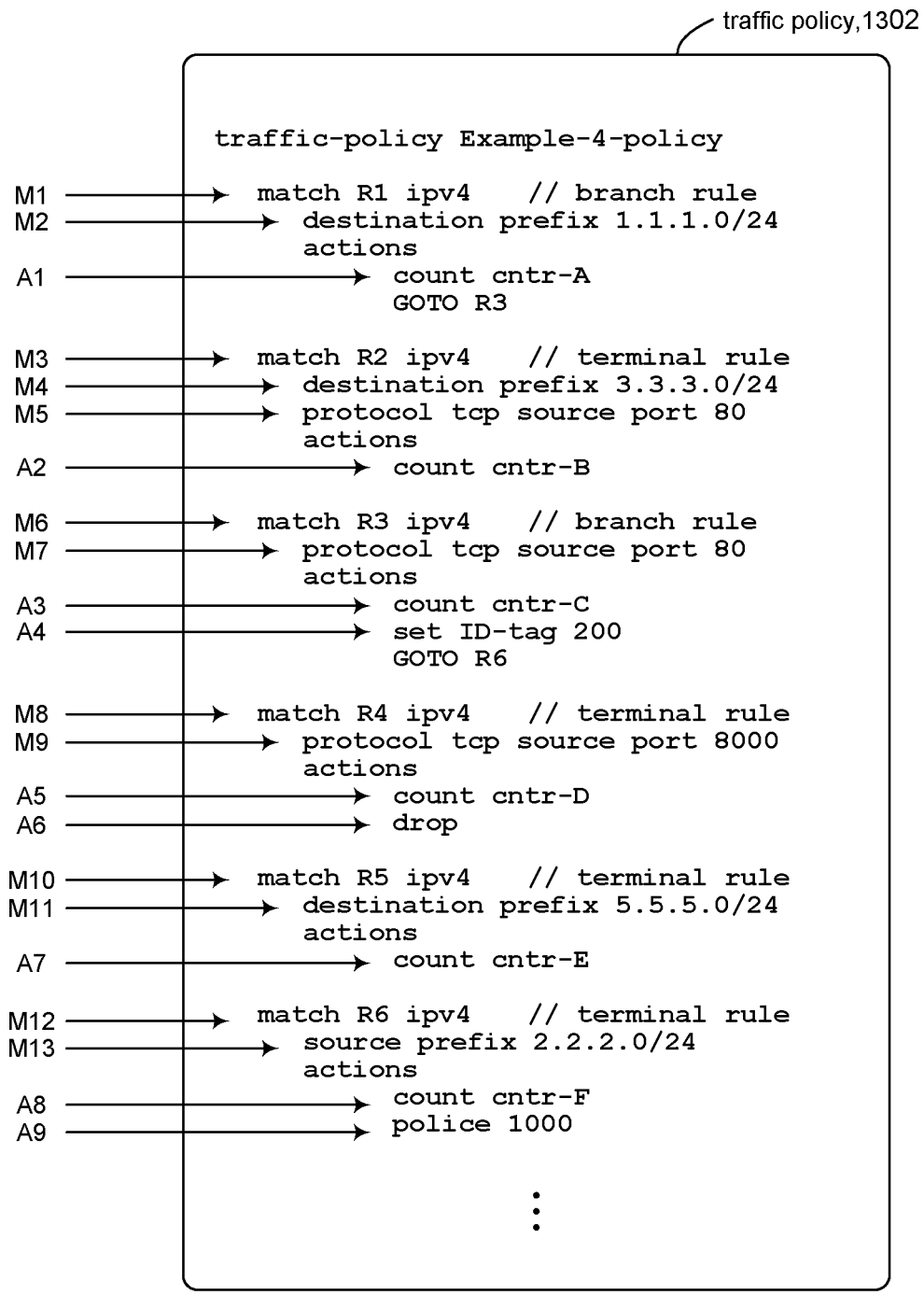
FIG. 13 shows an example of a traffic policy.

Referring to FIG. 13, a GOTO chain refers to a chain of rules that follow each other by virtue of GOTO actions in the branch rules; the chain ends with a terminal (non-branch) rule. Consider, for instance, the policy rules in illustrative traffic policy 1302. The chain {R1, R3, R6} represents an example of a GOTO chain. The chain is matched when a packet matches branch rules R1, R3, and terminal rule R6. Branch rule R1 includes a GOTO action that branches to rule R3. Rule R3, in turn, includes a GOTO action that branches to rule R6. Terminal rule R6 ends the chain. The chain {R1, R4} represents an example when a packet matches R1, does not match R3, but matches R4.

As explained above in connection with FIG. 5, the action(s) in each rule that constitute a chain of rules can be combined into a list of actions. The list of actions can be viewed as the union of the action(s) in each of the policy rules in the chain. For example, the list of actions for the chain {R1, R3, R6} includes:

"COUNT CNTR-A", "COUNT CNTR-C", "SET ID-TAG 200", "COUNT CNTR-F", "POLICE 1000" Likewise, the list of actions for the chain {R1, R4} includes:

"COUNT CNTR-A", "COUNT CNTR-D", "DROP"

The match criteria and the list of actions for each chain can be programmed as a packet filter (TCAM rule) in the TCAM of the network device. When a filter matches a packet, the packet processing hardware can execute each action in the list. Consider, for example, the {R1, R3, R6} chain. In some embodiments, the packet processing hardware may be able to execute the SET ID-TAG action, the POLICE action, and the three COUNT actions: "COUNT EDGE", "COUNT EDGE-SERVICES-ACCEPT", "COUNT EDGE2". However, in other embodiments it may be that the packet processing hardware cannot execute multiple COUNT actions; e.g., the hardware may only be able to execute a single COUNT action. Similar restrictions may apply to other actions due to other constraints or resource limits in the packet processing hardware. The discussion will now turn to a description of aspects of the present disclosure that can accommodate for such constraints in the packet processing hardware.

In accordance with some embodiments, actions can be categorized. For example, in some embodiments the COUNT action falls into an action category called ACCOUNTING. Following is an illustrative, non-exhaustive list of action categories and actions within each category:

TERMINAL
    DROP—this action instructs the packet processor to drop (not forward) the packet.
REDIRECTION
    REDIRECT AGGREGATION GROUP A—this action redirects the packet to aggregation group A
    REDIRECT INTERFACE A—this action redirects the packet to interface A
    REDIRECT NEXT-HOP GROUP A—this action redirects the packet to next hop group A
    REDIRECT NEXT-HOP A—this action redirects the packet to next hop A
ACCOUNTING
    COUNT A—this action increments counter A
    LOG A—this action writes information to data log (data store) A
    MULTICAST-CHAIN A—this action forwards the packet to multiple destinations specified in the chain, identified by A, that contains a list of routes of the multiple destinations
PACKET MODIFICATION
    SET DSCP A—this action sets the Differentiated Services Code Point (DSCP) data field in an IPv4 header to a value A SET ID-TAG A—this action specifies the data replication method, and in this particular example the matching packet is tagged with the VLAN number specified by A.

SET TRAFFIC-CLASS A—this action sets the value of traffic-class (TC) in an IPv6 header to A

RATE LIMITING

POLICE rate A—this action sets a data rate of A for matching packets (e.g., 1000 Mbp)

SAMPLING

SFLOW DestA—this action performs sampling of matched packets (e.g., every $n^{th}$ matched packet), where the sampled packets are sent to DestA (e.g., DestA can identify a server (e.g., its IP address) that receives packet samples for offline analysis)

Figure 14:
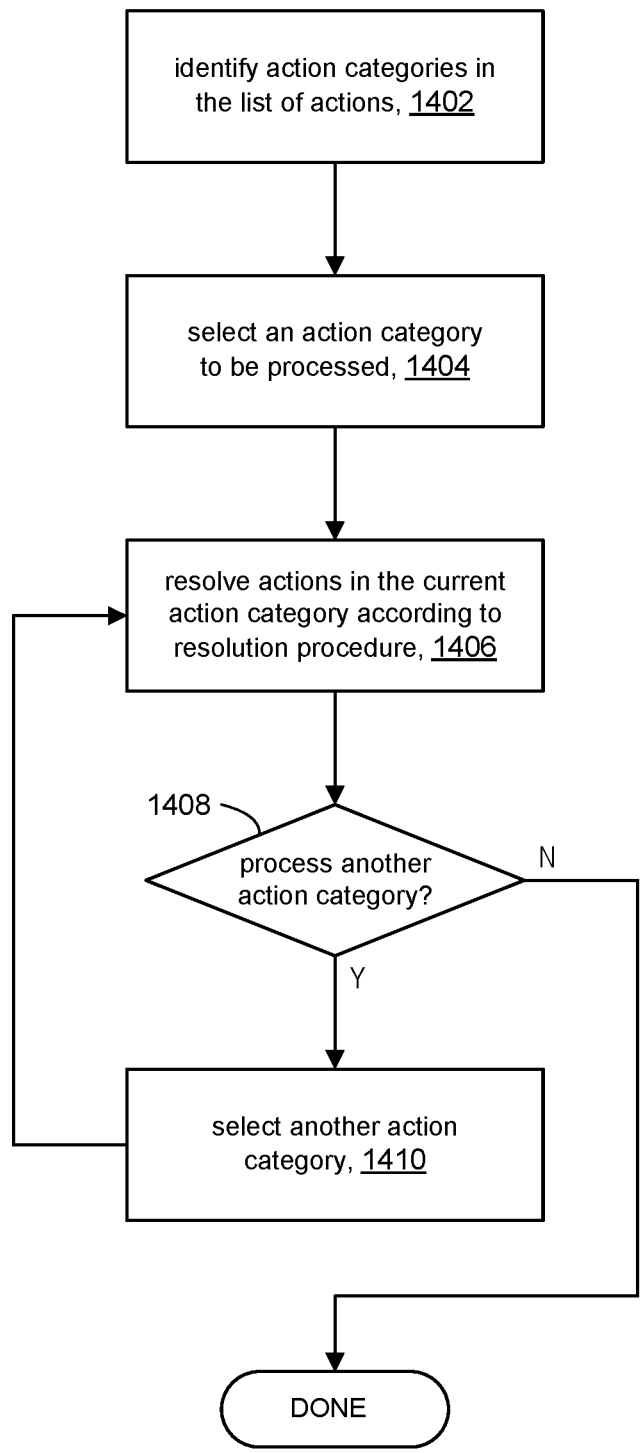
FIG. 14 shows a flow of operations for resolving a list of actions in accordance with the present disclosure.

FIG. 14 is a high-level representation of processing in a network device to resolve a list of actions in accordance with the present disclosure to accommodate packet processing hardware that may have certain operating constraints. In some embodiments, the network device can include one or more digital processing units, which when operated, can cause the network device to perform processing in accordance with FIG. 14. Digital processing units can include general CPUs in the control plane that operate by way of executing computer program code stored on a non-volatile computer readable storage medium (e.g., read-only memory); for example, CPU 102 (FIG.1) in the control plane can be a general CPU. The flow of operations performed by the network device is not necessarily limited to the order of operations shown.

The following operations describe processing in the network device to resolve actions in a GOTO chain. The operations can be part of the process of producing TCAM rules from a traffic policy. It will be appreciated that in other embodiments, the processing can occur in a central controller rather than a network device. The TCAM rules can be downloaded from the central controller and programmed into the network device. In still other embodiments, the processing operations may be shared between a central controller and a network device.

The processing in FIG. 14 begins with a list of actions in a TCAM rule (packet filter) produced from a GOTO chain identified in the traffic policy, referred to in FIG. 5 as "paths" (operations 506, 508). Referring again to FIG. 13, for instance, the chain {R1, R3, R6} can result in the following TCAM rule:

<{M1, M2, M6, M7, M12, M13}, {A1, A3, A4, A8, A9}> where {A1, A3, A4, A8, A9} would be the list of actions associated with the chain to be resolved in accordance with the present disclosure. In some embodiments, for example, the three COUNT actions (A1, A3, A8) in the list can be resolved to produce a single COUNT action. It will be understood that the list of actions can include any number of actions in any number of categories, depending on the specific branch rules in a given chain. In some embodiments, the processing in FIG. 14, may be incorporated into operation 508 in FIG. 5.

At operation 1402, the network device can identify the action categories in the list of actions for a given chain of branch rules. Each action in the list is determined or otherwise identified as belonging to an action category. In the example above, for instance, the three COUNT actions fall into the ACCOUNTING action category. Depending on the actions in the list, this operation can identify one or more action categories. The action categories described above will be used for discussion purposes. It will be appreciated, however, that in other embodiments additional or different categories can be defined.

At operation 1404, the network device can select a category of actions to be processed. In accordance with some embodiments, the actions can be processed in an iterative manner on a category by category basis. Accordingly, processing can begin by selecting one of the action categories described above as a "current action category" to be processed in the current iteration.

At operation 1406, the network device can resolve the action(s) in the current action category according to a resolution procedure (mechanism, logic, algorithm) that corresponds to that category. The procedure for resolving actions in an action category can vary depending on the nature of actions in that category. This aspect of the present disclosure is discussed in more detail below.

At decision point 1408, the network device can determine whether or not to process action in another action category. In accordance with some embodiments, some actions can render other actions unnecessary. Consider, for example, a list of actions that includes redirecting a packet and dropping a packet. If a filter that contains those rules is matched by a packet, the drop action would cause the packet to be dropped and so the redirect action would not need to be performed.

On the other hand, some actions may be performed regardless of whether the packet is dropped or forwarded. For example, the ACCOUNTING category comprises actions such as COUNT and LOG that affect packet metadata (information relating to the packet such as counters, logs, etc.) rather than the packet itself and so can always be performed irrespective of what happens to the packet. The SAMPLING action category, likewise, can always be performed irrespective of what happens to the packet.

Accordingly, in some embodiments, decision point 1408 can implement the following decision making process:

If the current action category is other than the TERMINAL category, then continue to operation 1410 to begin processing actions in another category of actions.

If the current action category is the TERMINAL category, then continue to operation 1410 to process any actions that are in the ACCOUNTING category or the SAMPLING category.

Otherwise, do not process any further actions. Processing of the action list can be deemed complete.

At operation 1410, the network device can select another action category to be processed. Processing can return to operation 1406 to resolve actions in the next category.

The discussion will now turn to a description of resolution procedures (see operation 1406) in accordance with some embodiments. A resolution procedure refers to processing applied to actions in a given action category to "resolve" multiple actions in that category to reduce the number of actions in that category in order to accommodate any constraints on execution actions that may be imposed by the packet processing hardware.

In some embodiments, the procedure to resolve a list of actions in a chain of rules can be based on the priorities of the policy rules that constitute the chain. In some embodiments, for example, a given category of actions in the list can be resolved by selecting the action that appears in the highest priority policy rule in the chain. For example, in the chain {R1, R3, R6} in FIG. 13, the list of actions is:

"COUNT CNTR-A", "COUNT CNTR-C", "SET ID-TAG 200", "COUNT CNTR-F", "POLICE 1000".

Consider the ACCOUNTING action category. The actions in the ACCOUNTING category are the three COUNT actions. The three COUNT actions can be resolved selecting the count action that appears in the highest priority policy rule among rules R1, R3, and R6 in the chain, in this case rule R1, to produce the action "COUNT CNTR-A" as the resolved action. In other embodiments, the list can be resolved by taking the action from the lowest priority policy rule in the chain, which for the {R1, R3, R6} chain would be "COUNT CNTR-F" where rule R6 is the lowest priority policy rule in the chain.

In accordance with some embodiments, each action category can be associated with its own respective resolution procedure. Due to the different nature of the action categories, the corresponding resolution procedures can be different from each other. To illustrate this point, the discussion will turn to a description of some resolution procedures.

Figure 15:
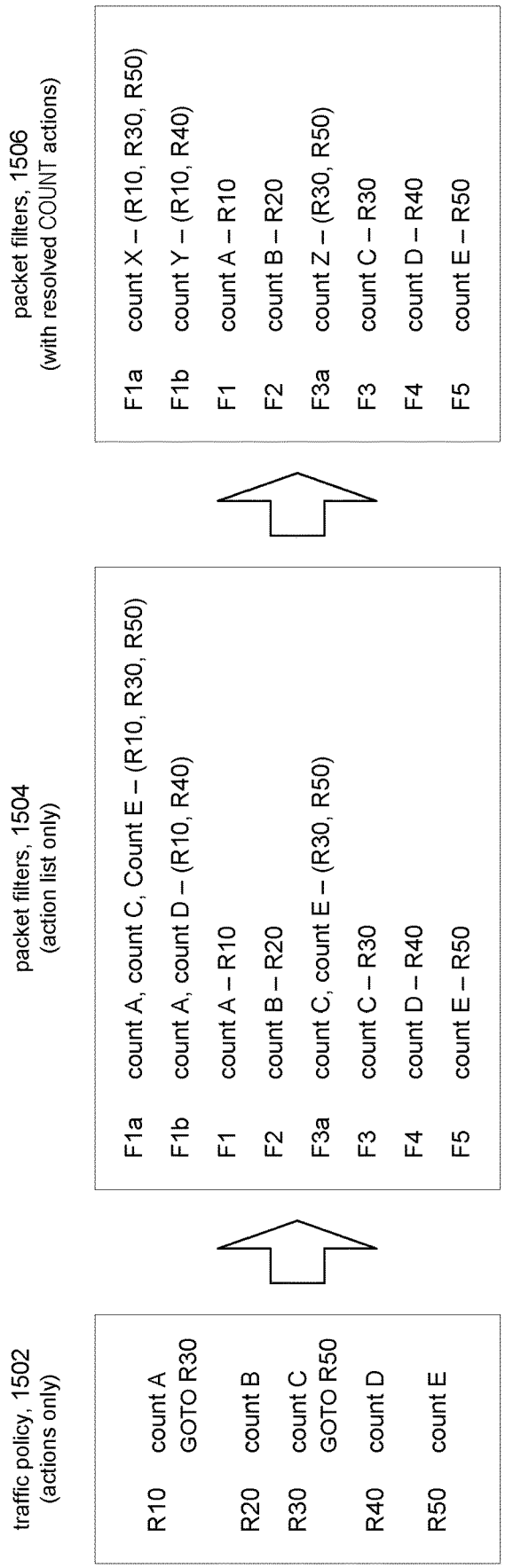
FIG. 15 shows a traffic policy compiled in accordance with the present disclosure.

Referring, for example, to FIG. 15 consider a resolution procedure for the ACCOUNTING action category. FIG. 15 shows an example of a traffic policy 1502 that comprises policy rules R10, R20, R30, R40, R50. Only the actions are shown. FIG. 15 shows the corresponding packet filters (TCAM rules) 1504 that can be generated from the traffic policy. Assume for discussion purposes the packet processor hardware is capable of executing only one COUNT action. As such, the list of COUNT actions in packet filters F1a, F1b, F3a need to be resolved to reduce the list to a single COUNT action.

As noted above, in some embodiments, a resolution procedure to resolve the COUNT action can select the highest (or lowest) priority policy rule. For example, filter F1a represents the chain R10, R30, R50 and comprises a list of three COUNT actions. The list of actions in filter F1a can be resolved to COUNT A (COUNT action of rule R10, the highest priority policy rule) in one instance, or to COUNT E (COUNT action of rule R50, the lowest priority policy rule) in another instance.

In accordance with other embodiments, the resolution procedure for resolving the COUNT actions in original filters 1504 can create the following resolved counters in resolved filters 1506:
X—counter for when filter F1a hits
Y—counter for when filter F1b hits
Z—counter for when filter F3a hits
A—counter for when filter F1 hits
C—counter for when filter F3 hits
D—counter for when filter F4 hits
E—counter for when filter F5 hits When counter X is incremented, that represents incrementing each of constituent counters A, C, and E. Likewise, when counter Y is incremented, that represents an increment of constituent counters A and D. When counter Z is incremented, that represents an increment for constituent counters C and E. Note that individual counters A, C, D, and E are incremented when their respective filters R10, R30, R40, R50 match a packet. It can be appreciated that the total count for a given counter is the sum of the given counter itself and all other counters that include the given counter as a constituent. For example, when a user (e.g., network administrator) calls up a count value for counter A, the count value can be computed as follows:
total count for A=A+X+Y
Likewise, for counters C, D, and E:
total count for C=C+X+Z
total count for D=D+Y
total count for E=E+X+Z Next, consider as another example a resolution procedure for the REDIRECTION action category. Suppose a traffic policy contains the following policy rules:

---

Rule A
    Actions: REDIRECT interface Et1, GOTO B
        •
        •
Rule B
    Actions: REDIRECT interface Et2, GOTO C
        •
        •
Rule C
    Actions: redirect interface Et3

---

A packet that matches policy rules A, B, and C should be redirected to interfaces Et1, Et2, and Et3. Suppose we want to resolve the list of three REDIRECT actions into a single action. A resolution procedure in accordance with some embodiments can resolve the list of three actions by taking the REDIRECT action of the highest (or lowest) priority policy rule, namely redirect to interface Et1 (or Et3). In other embodiments, the resolution procedure can create a multicast chain that goes out on all three interfaces.

Next, consider a resolution procedure for the RATE LIMITING action category. Given a traffic policy containing a chain of GOTO rules where 1 or more rate limiting actions are present, and the hardware's ability to impose P number of rate limiting actions, the resolution procedure can select the P most restrictive (i.e., the lowest committed information rate, CIR) limiting actions in the chain. For instance, suppose P=1 and the traffic policy comprises:

---

Rule A
    Actions: POLICE 1000 mbps, GOTO B
        •
        •
Rule B
    Actions: POLICE 10 mbps, GOTO C
        •
        •
Rule C
    Actions: POLICE 100 mbps

---

A packet matching policy rules A, B, and C would result in matching traffic flow to be policed at a rate of 10 mbps.

Now consider a resolution procedure for the SAMPLING action category. A resolution procedure for a chain of rules containing 1 or more SAMPLING actions follows ALL actions in the intersection. For instance, suppose a traffic policy comprises:

---

Rule A
    Actions: SFLOW DestA GOTO B
        •
        •
Rule B
    Actions: SFLOW DestB, GOTO C
        •
        •
Rule C
    Actions: SFLOW DestC

---

A packet matching policy rules A, B, and C would result in sampling the packet and sending the packet to each of the destinations: DestA, DestB, DestC. If the packet processing hardware is limited to sending sampled packets to only one destination, then the sample can be sent to the destination associated with the highest (or lowest) priority policy rule.

It can be appreciated from the above examples of resolution procedures, that the specific operations for resolving a given action category depend heavily on the nature of the actions in that action category.

Features described above as well as those claimed below may be combined in various ways without departing from the scope hereof. The following examples illustrate some possible, non-limiting combinations:

(A1) A method for programming a traffic policy in a network device, the traffic policy comprising branch rules and non-branch rules, wherein the branch rules include non-branch actions and branch actions that specify other rules in the traffic policy, wherein the non-branch rules do not include branch actions, the method comprising: identifying a chain of rules comprising a plurality of branch rules in the traffic policy, the chain of rules associated a plurality of actions from the chain of rules; identifying at least one group of actions among the plurality of actions that are associated with an action category; resolving the at least one group of actions according to a resolution procedure that corresponds to the action category of the at least one group of actions to produce a resolved action that represents the at least one group of actions; and storing a packet filter comprising the resolved action to a ternary content-addressable memory (TCAM) of the network device.

(A2) For the method denoted as (A1), the resolution procedure includes selecting as the resolved action an action in the at least one group of actions that is associated with a highest priority rule in the chain of rules.

(A3) For the method denoted as any of (A1) through (A2), the resolution procedure includes selecting as the resolved action an action in the at least one group of actions that is associated with a lowest priority rule in the chain of rules.

(A4) For the method denoted as any of (A1) through (A3), the resolution procedure produces only one resolved action.

(A5) For the method denoted as any of (A1) through (A4), a first resolution procedure for a first action category is different from a second resolution procedure for a second action category.

(A6) For the method denoted as any of (A1) through (A5), further comprising: identifying additional groups of actions among the plurality of actions; and resolving each additional group of actions according to a resolution procedure that corresponds to an action category with which the additional group is associated.

(B1) A network device comprising: one or more computer processors; a computer-readable storage medium; and a forwarding information base (FIB). The computer-readable storage medium comprising instructions for controlling the one or more computer processors to: receive a traffic policy comprising branch policy rules and non-branch policy rules; identify a chain of rules from the traffic policy, the chain of rules being associated with a plurality of actions from rules in the chain of rules; generate one or more resolved actions from the plurality of actions using one or more resolution algorithms that correspond to action categories that represent the plurality of actions; and program the FIB with a packet filter that represents the chain of rules and comprises the one or more resolved actions.

(B2) For the network device denoted as (B1), wherein one of the resolution algorithms includes selecting, as a resolved action, an action from a group of actions, wherein the selected action is selected from a policy rule that is chosen based on its priority.

(B3) For the network device denoted as any of (B1) through (B2), the computer-readable storage medium further comprises instructions for controlling the one or more computer processors to: resolve a first group of actions associated with a first action category according to a first resolution algorithm that corresponds to the first action category to produce a first resolved action; and resolve a second group of actions associated with a second action category according to a second resolution algorithm that corresponds to the second action category to produce a second resolved action.

(B4) For the network device denoted as any of (B1) through (B3), a first resolution algorithm for a first action category is different from a second resolution algorithm for a second action category.

(B5) For the network device denoted as any of (B1) through (B4), one of the resolution algorithms produces only one resolved action.

(B6) For the network device denoted as any of (B1) through (B5), the computer-readable storage medium further comprises instructions for controlling the one or more computer processors to generate match criteria that represent the same matching semantics as the chain of rules, wherein the packet filter further comprises the match criteria.

(C1) A computing apparatus comprising: one or more computer processors; and a computer-readable storage medium comprising instructions for controlling the one or more computer processors to: receive a traffic policy comprising branch policy rules and non-branch policy rules; identify a chain of rules from the traffic policy, the chain of rules being associated with a plurality of actions from rules in the chain of rules; generate one or more resolved actions from the plurality of actions using one or more resolution algorithms that correspond to action categories that represent the plurality of actions; and generate a packet filter that represents the chain of rules and comprises the one or more resolved actions.

(C2) For the computing apparatus denoted as (C1), the computing apparatus is a network device, wherein the generated packet filter is programmed to a memory of the network device.

(C3) For the computing apparatus denoted as any of (C1) through (C2), one of the resolution algorithms includes selecting, as a resolved action, an action from a group of actions, wherein the selected action is selected from a policy rule that is chosen based on its priority.

(C4) For the computing apparatus denoted as any of (C1) through (C3), the computer-readable storage medium further comprises instructions for controlling the one or more computer processors to: resolve a first group of actions associated with a first action category according to a first resolution algorithm that corresponds to the first action category to produce a first resolved action; and resolve a second group of actions associated with a second action category according to a second resolution algorithm that corresponds to the second action category to produce a second resolved action.

(C5) For the computing apparatus denoted as any of (C1) through (C4), a first resolution algorithm for a first action category is different from a second resolution algorithm for a second action category.

(C6) For the computing apparatus denoted as any of (C1) through (C5), one of the resolution algorithms produces only one resolved action.

(C7) For the computing apparatus denoted as any of (C1) through (C6), the chain of rules includes a non-branch policy rule, wherein the plurality of actions includes actions from the non-branch policy rule.

(C8) For the computing apparatus denoted as any of (C1) through (C6), the computer-readable storage medium further comprises instructions for controlling the one or more computer processors to generate match criteria that represent the same matching semantics as the chain of rules, wherein the packet filter further comprises the match criteria.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for programming a traffic policy in a network device, the method comprising:
   accessing a traffic policy comprising branch rules and non-branch rules, wherein the branch rules and non-branch rules include actions, wherein the branch rules include branch actions in addition to non-branch actions, wherein the branch actions specify other rules anywhere in the traffic policy;
   identifying a chain of rules comprising a plurality of branch rules and a non-branch rule in the traffic policy, wherein each of the branch rules references another rule in the chain of rules, wherein a last branch rule references the non-branch rule;
   identifying at least one group of actions comprising two or more non-branch actions of a same action category from among a plurality of actions in the chain of rules;
   resolving the two or more non-branch actions in the at least one group of actions according to a resolution procedure that corresponds to the action category of the two or more non-branch actions to produce a resolved action that represents the two or more non-branch actions; and
   storing a packet filter comprising the resolved action to a ternary content-addressable memory (TCAM) of the network device.

2. The method of claim 1, wherein the resolution procedure includes selecting as the resolved action an action in the at least one group of actions that is associated with a highest priority rule in the chain of rules.

3. The method of claim 1, wherein the resolution procedure includes selecting as the resolved action an action in the at least one group of actions that is associated with a lowest priority rule in the chain of rules.

4. The method of claim 1, wherein the resolution procedure produces only one resolved action.

5. The method of claim 1, wherein a first resolution procedure for a first action category is different from a second resolution procedure for a second action category.

6. The method of claim 1, further comprising: identifying additional groups of actions among the plurality of actions; and resolving each additional group of actions according to a resolution procedure that corresponds to an action category with which the additional group is associated.

7. A network device comprising:
   one or more computer processors;
   a computer-readable storage medium; and
   a forwarding information base (FIB),
   the computer-readable storage medium comprising instructions for controlling the one or more computer processors to:
   receive a traffic policy comprising branch rules and non-branch rules, wherein the branch rules and non-branch rules include non-branch actions, wherein the branch rules further include branch actions, wherein each branch action specifies any one of the rules in the traffic policy;
   identify a chain of rules that comprises a plurality of branch rules and a non-branch rule from the traffic policy, wherein each of the branch rules references another rule in the chain of rules, wherein a last branch rule references the non-branch rule, the chain of rules being associated with a plurality of actions from rules in the chain of rules;
   generate one or more resolved actions from the plurality of actions in the chain of rules using one or more resolution algorithms, each resolved action representing two or more non-branch actions in the chain of rules; and
   program the FIB with one or more packet filters that represent the chain of rules and comprise the one or more resolved actions.

8. The network device of claim 7, wherein one of the resolution algorithms includes selecting, as a resolved action, an action from a group of actions, wherein the selected action is selected from a policy rule that is chosen based on its priority.

9. The network device of claim 7, wherein the computer-readable storage medium further comprises instructions for controlling the one or more computer processors to:
   resolve a first group of actions associated with a first action category according to a first resolution algorithm that corresponds to the first action category to produce a first resolved action; and
   resolve a second group of actions associated with a second action category according to a second resolution algorithm that corresponds to the second action category to produce a second resolved action.

10. The network device of claim 7, wherein a first resolution algorithm for a first action category is different from a second resolution algorithm for a second action category.

11. The network device of claim 7, wherein one of the resolution algorithms produces only one resolved action.

12. The network device of claim 7, wherein the computer-readable storage medium further comprises instructions for controlling the one or more computer processors to generate match criteria that represent the same matching semantics as the chain of rules, wherein the packet filter further comprises the match criteria.

13. A computing apparatus comprising:
   one or more computer processors; and
   a computer-readable storage medium comprising instructions for controlling the one or more computer processors to:
   receive a traffic policy comprising branch rules and non-branch rules, wherein the branch rules and non-branch rules include actions, wherein the branch rules further include branch actions, wherein each branch action specifies any one of the rules in the traffic policy;
   identify a chain of rules that comprises a plurality of branch rules and a non-branch rule from the traffic policy, wherein each of the branch rules references another rule in the chain of rules, wherein a last branch rule references the non-branch rule;
   generate one or more resolved actions from a plurality of actions in the chain of rules using one or more resolution algorithms, each resolved action representing two or more non-branch actions in the chain of rules; and generate one or more packet filters that represent the chain of rules and comprise the one or more resolved actions.

14. The computer apparatus of claim 13, wherein the computing apparatus is a network device, wherein the generated packet filter is programmed to a memory of the network device.

15. The computer apparatus of claim 13, wherein one of the resolution algorithms includes selecting, as a resolved action, an action from a group of actions, wherein the selected action is selected from a policy rule that is chosen based on its priority.

16. The computer apparatus of claim 13, wherein the computer-readable storage medium further comprises instructions for controlling the one or more computer processors to:
 resolve a first group of actions associated with a first action category according to a first resolution algorithm that corresponds to the first action category to produce a first resolved action; and
 resolve a second group of actions associated with a second action category according to a second resolution algorithm that corresponds to the second action category to produce a second resolved action.

17. The computer apparatus of claim 13, wherein a first resolution algorithm for a first action category is different from a second resolution algorithm for a second action category.

18. The computer apparatus of claim 13, wherein one of the resolution algorithms produces only one resolved action.

19. The computer apparatus of claim 13, wherein the chain of rules includes a non-branch policy rule, wherein the plurality of actions includes actions from the non-branch policy rule.

20. The computer apparatus of claim 13, wherein the computer-readable storage medium further comprises instructions for controlling the one or more computer processors to generate match criteria that represent the same matching semantics as the chain of rules, wherein the packet filter further comprises the match criteria.

* * * * *